(12) United States Patent
Kong et al.

(10) Patent No.: US 8,738,982 B2
(45) Date of Patent: May 27, 2014

(54) METHOD OF COMMUNICATION IN MOBILE COMMUNICATION SYSTEM

(75) Inventors: Tae Gon Kong, Anyang-si (KR); Yong Ho Kim, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 633 days.

(21) Appl. No.: 12/596,363

(22) PCT Filed: Apr. 18, 2008

(86) PCT No.: PCT/KR2008/002215
§ 371 (c)(1), (2), (4) Date: Oct. 16, 2009

(87) PCT Pub. No.: WO2008/130157
PCT Pub. Date: Oct. 30, 2008

(65) Prior Publication Data
US 2010/0112957 A1    May 6, 2010

Related U.S. Application Data

(60) Provisional application No. 60/912,886, filed on Apr. 19, 2007.

(30) Foreign Application Priority Data

May 22, 2007  (KR) .................. 10-2007-0049522
May 22, 2007  (KR) .................. 10-2007-0049523

(51) Int. Cl.
*H04L 1/18*  (2006.01)

(52) U.S. Cl.
USPC ........... 714/749; 375/211; 375/346; 375/377; 342/458; 714/751; 714/780; 714/758

(58) Field of Classification Search
USPC ........... 375/211, 346, 377; 342/458; 714/749, 714/751, 780, 758
See application file for complete search history.

(56) References Cited

U.S. PATENT DOCUMENTS

| | | | |
|---|---|---|---|
| 5,946,320 A | 8/1999 | Decker | |
| 6,654,926 B1 * | 11/2003 | Raphaeli et al. | 714/780 |
| 6,977,888 B1 | 12/2005 | Frenger et al. | |
| 7,002,923 B2 | 2/2006 | Golitschek et al. | |
| 7,013,143 B2 | 3/2006 | Love et al. | |
| 7,321,940 B1 * | 1/2008 | Smith et al. | 709/240 |
| 7,664,198 B2 | 2/2010 | Kalhan et al. | |
| 2002/0061080 A1 * | 5/2002 | Richards et al. | 375/346 |
| 2002/0089451 A1 * | 7/2002 | Wang et al. | 342/458 |

(Continued)

FOREIGN PATENT DOCUMENTS

| | | |
|---|---|---|
| KR | 10-2004-0064648 A | 7/2004 |
| KR | 10-2007-0034426 A | 3/2007 |

*Primary Examiner* — Joshua P Lottich
*Assistant Examiner* — Jeison C Arcos
(74) *Attorney, Agent, or Firm* — Birch, Stewart, Kolasch & Birch, LLP

(57) ABSTRACT

A data processing method and a data re-transmission method in a broadband wireless access system are disclosed. A transmitting side generates a coded block set including coded blocks of a predetermined number and the coded blocks are transmitted to first and second base stations. The transmitting side sets a timer after transmitting a last coded block of the coded blocks. The coded blocks received by the second base station are transmitted to the first base station, and the transmitting side receives a control signal indicating whether there is a transmission error from the first base station.

4 Claims, 15 Drawing Sheets

(56) References Cited

U.S. PATENT DOCUMENTS

| | | | |
|---|---|---|---|
| 2002/0168945 A1 | 11/2002 | Hwang et al. | |
| 2003/0145269 A1* | 7/2003 | Kuo et al. | 714/749 |
| 2003/0169741 A1* | 9/2003 | Torsner et al. | 370/394 |
| 2003/0210668 A1* | 11/2003 | Malladi et al. | 370/335 |
| 2003/0217319 A1* | 11/2003 | Tripathi et al. | 714/751 |
| 2004/0037224 A1* | 2/2004 | Choi et al. | 370/235 |
| 2004/0073626 A1* | 4/2004 | Major et al. | 709/217 |
| 2004/0147286 A1 | 7/2004 | Kim et al. | |
| 2004/0219917 A1* | 11/2004 | Love et al. | 455/436 |
| 2005/0249296 A1 | 11/2005 | Axnas et al. | |
| 2005/0250497 A1 | 11/2005 | Ghosh et al. | |
| 2005/0251721 A1 | 11/2005 | Ramesh et al. | |
| 2005/0251722 A1* | 11/2005 | Terry et al. | 714/749 |
| 2006/0067394 A1* | 3/2006 | Chen | 375/229 |
| 2006/0200722 A1 | 9/2006 | Braun | |
| 2006/0251015 A1 | 11/2006 | Khan | |
| 2006/0292992 A1 | 12/2006 | Tajima et al. | |
| 2007/0104130 A1* | 5/2007 | Venkatachalam | 370/329 |
| 2007/0153923 A1* | 7/2007 | Pi et al. | 375/260 |
| 2007/0183451 A1* | 8/2007 | Lohr et al. | 370/473 |
| 2007/0245203 A1 | 10/2007 | Cho et al. | |
| 2007/0280193 A1 | 12/2007 | Kim et al. | |
| 2008/0107197 A1* | 5/2008 | Jen | 375/260 |
| 2008/0123601 A1* | 5/2008 | Malladi et al. | 370/335 |
| 2008/0253326 A1* | 10/2008 | Damnjanovic | 370/329 |
| 2008/0256410 A1 | 10/2008 | Park et al. | |
| 2008/0267129 A1* | 10/2008 | Torsner et al. | 370/331 |
| 2008/0276148 A1* | 11/2008 | Lohr et al. | 714/750 |
| 2008/0301516 A1* | 12/2008 | Han et al. | 714/748 |
| 2009/0109907 A1* | 4/2009 | Tsai et al. | 370/329 |
| 2009/0168708 A1* | 7/2009 | Kumar et al. | 370/329 |
| 2010/0172319 A1* | 7/2010 | Shimobayashi | 370/331 |

* cited by examiner

FIG. 6b

| Coefficient | Coded data block |

FIG. 6c

| Seed | Coded data block |

METHOD OF COMMUNICATION IN MOBILE COMMUNICATION SYSTEM

This application is the National Phase of PCT/KR2008/002215 filed on Apr. 18, 2008, which claims priority under 35 U.S.C. 119(e) to U.S. Provisional Application No. 60/912,886 filed on Apr. 19, 2007, and under 35 U.S.C. 119(a) to Patent Application No. 10-2007-0049522 filed in Republic of Korea on May 22, 2007, and 10-2007-0049523 filed in Republic of Korea on May 22, 2007, all of which are hereby expressly incorporated by reference into the present application.

TECHNICAL FIELD

Embodiments of present invention relate to a data processing method and a data re-transmission method in a wireless access system. Furthermore the embodiments of present invention relate to a data communication system between one or more base stations and a mobile station located at a cell boundary of one or more base stations.

BACKGROUND ART

Hereinafter, a data re-transmission method is described in brief.

If a transmitting side transmits data, a receiving side receives the data. If data transmission fails, the receiving side requests the transmitting side to re-transmit the corresponding data. An automatic repeat request (ARQ) scheme is generally used as a data re-transmission technique at this time.

The ARQ scheme is to transmit an acknowledgement (ACK) signal and/or a non-acknowledgement (NACK) signal to inform the transmitting side whether data has accurately been received after the receiving side receives the data. If the receiving side transmits the NACK signal to the transmitting side, the transmitting side re-transmits data corresponding to the NACK signal.

The ARQ scheme includes stop-and-wait (SAW) ARQ, go-back-N (GBN) ARQ, and selective-repeat (SR) ARQ.

FIG. 1 is a diagram for explaining a SAW ARQ scheme.

Referring to FIG. 1, 'A' and 'B' denote a transmitting side and a receiving side, respectively. The horizontal axis represents transmission of a frame with lapse of time. The frame is expressed by 'fr'.

In the SAW ARQ scheme as illustrated in FIG. 1, a transmitting side waits for an ACK or NACK signal after transmitting data. Upon receipt of the ACK signal, the transmitting side transmits the next data, and upon receipt of the NACK signal, the transmitting side re-transmits the same data. Namely, in the SAW ARQ scheme, only one frame is transmitted at a time. The transmitting side transmits the next data after it is confirmed that data has been successfully transmitted. Although the SAW ARQ scheme may be easily achieved, efficiency is lowered because the next data can not be transmitted until the transmitting side receives the ACK signal after data transmission.

FIG. 2 is a diagram for explaining a GBN ARQ scheme.

In the GBN ARQ scheme, a transmitting side transmits data continuously irrespective of a response message. Referring to FIG. 2, if a data sequence of a third frame is lost while a transmitting side transmits data, the transmitting side re-transmits data from the third frame because it has not received an ACK signal of the third frame. Since the GBN ARQ scheme should assign and manage a sequence number for every frame, its construction may be complicated. Moreover, correctly received data may be discarded.

FIG. 3 is a diagram for explaining an SR ARQ scheme.

The SR ARQ scheme is to re-transmit only data for which NACK signal is received. Referring to FIG. 3, the receiving side which has not received data of a second frame transmits a NACK signal to a transmitting side. The transmitting side then re-transmits data of the second frame representing the NACK signal.

In a data re-transmission method used generally under a high-speed data transmission circumstance, there may a very long time delay. That is, a wireless resource may be wasted in a communication network. Further, errors may frequently occur in data transmitted in a wired or wireless network and much information should be transmitted for a re-transmission request for erroneous data. This may be a cause which can not ensure a data service of high quality.

Meanwhile, a transmitting side (for example, a mobile station) located at a cell boundary or a transmitting side located at a place where it is possible to communicate with two or more receiving sides is influenced by an inferior wireless area. Then the transmitting side is subject to a service of low quality. To overcome this problem, there have been information exchanges between receiving sides (for example, base stations) and complicate signal exchange between the transmitting side and the receiving side. Therefore, resources are wasted and time is delayed in the process of communication between the transmitting side and the receiving side.

DISCLOSURE

Technical Problem

The embodiments of the present invention provide a data communication method in a wireless access system.

An object of the present invention is to provide an efficient data communication method when a receiving side located at a cell boundary of one or more base stations communicates with one or more base stations.

Another object of the present invention is to provide a communication method which minimizes the unnecessary use of a wired or wireless resource of a receiving side located at a cell boundary of one or more base stations and increases performance of the base stations and the receiving side.

A further object of the present invention is to provide a communication method which can ensure reliability of data communication and simultaneously minimize a time delay.

Technical Solution

To solve the technical problem, the present invention provides various embodiments.

In one aspect of the present invention, provided herein is an uplink data communication method in a communication system by transmitting side. The uplink data communication method comprises: generating a coded block set including coded blocks of a predetermined number; transmitting the coded blocks to first and second base stations; setting a timer after a last coded block among the coded blocks of the predetermined number; and receiving a control signal indicating whether there is a transmission error from the first base station by the transmitting side, wherein the second base station transmits received coded blocks to the first base station.

The control signal is an acknowledgment (ACK) signal and the ACK signal is generated in a unit of coded block set.

The uplink data communication method further comprises transmitting, by the transmitting side, the re-coded blocks to at least one of the first and second base stations when the ACK signal is not received from the first base station during the time interval of the timer.

The coded blocks are coded by using random linear coding and the coded blocks are independent of each other.

The coded block set is generated by coding original data in the unit of data block set, and the coded blocks of the predetermined number contained in the coded block set are generated by a coding process using a random coefficient.

In another aspect of the present invention, provided herein is an uplink data communication method in a communication system. The uplink data communication method comprises: receiving, by a first base station, first coded blocks of a predetermined number contained in a coded block set generated from a transmitting side; receiving, by a second base station, second coded blocks of a predetermined number from a second base station, wherein the second coded blocks are transmitted by the transmitting side; and performing decoding, by the first base station, by using the first and second coded blocks and transmitting an acknowledgment (ACK) signal to the transmitting side in a unit of coded block set.

The uplink data communication method further comprises transmitting non-acknowledgment (NACK) signals corresponding to the number of error occurrences to the transmitting side when first coded blocks of the predetermined number have an error.

The uplink data communication method further comprises receiving third coded blocks generated by as many as the number of NACK signals by the transmitting side, wherein the third coded blocks are independent of the first and second coded blocks In a further aspect of the present invention, provided herein is a downlink data communication method in a communication system. The downlink data communication method comprises: receiving first coded blocks of a predetermined number which are included in a coded block set and generated by a first base station; receiving second coded blocks of a predetermined number which are included in a coded block set generated by a second base station; and performing decoding when the total number of the received first coded blocks and the received second coded blocks is the same as the number of coded blocks contained in the coded block set.

The downlink data communication further comprises transmitting an acknowledgement (ACK) signal to the first base station in the unit of coded block set.

In still another aspect of the present invention, provided herein is a downlink data communication method in a communication system. The downlink data communication method comprises: a first base station generating a coded block set including first coded blocks of a predetermined number; the first base station transmitting the first coded blocks to a receiving side; a second base station generating the coded block set including second coded blocks of a predetermined number; the second base station transmitting the second coded blocks to the receiving side; the first base station setting a timer after a last coded block of the first coded blocks of the predetermined number; and the first base station receiving a control signal indicating whether there is a transmission error of the coded blocks from the receiving side.

Advantageous Effects

A data communication method between a transmitting side and a receiving side in a communication according to the embodiments of the present invention has the following advantages.

First, performance degradation according to a channel environment is minimized, and data communication is efficiently performed by avoiding unnecessary re-transmission in the case where one or more base stations communicate with a mobile station located at a cell boundary.

Second, communication performance between base stations and a receiving side is improved by minimizing unnecessary use of resources between one or more base stations and a mobile station located at a cell boundary and by thus saving a wired or wireless resource.

Third, a minimum transmission delay time is achieved and reliable data transmission can be performed by using random linear coding and random linear decoding by a transmitting side and a receiving side. That is, even though data transmitted by the transmitting side is lost or has errors in a wired or wireless network, rapid data communication can be implemented by the sharing and exchange of data information between receiving sides without a request by the receiving side for data re-transmission.

DESCRIPTION OF DRAWINGS

The accompanying drawings, which are included to provide a further understanding of the invention, illustrate embodiments of the invention and together with the description serve to explain the principle of the invention.

In the drawings:

FIG. 6b illustrates a method of transmitting a coefficient matrix by a data processing method according to an exemplary embodiment of the present FIG. 6c illustrates another method of transmitting a coefficient matrix by a data processing method according to an example of the present invention.

BEST MODE

Figure 1:
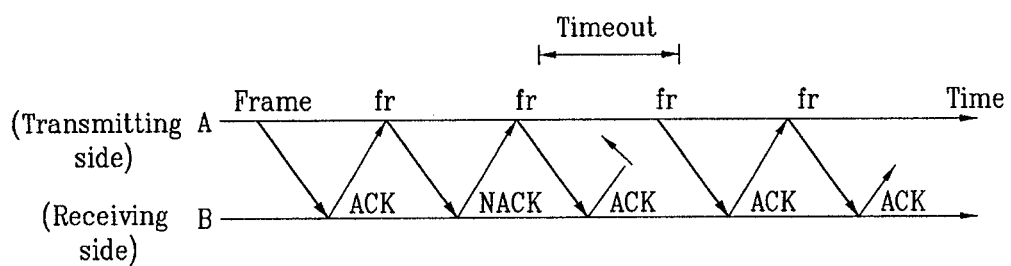
FIG. 1 illustrates a stop-and-wait (SAW) automatic repeat request (ARQ) scheme according to a prior art.
Figure 2:
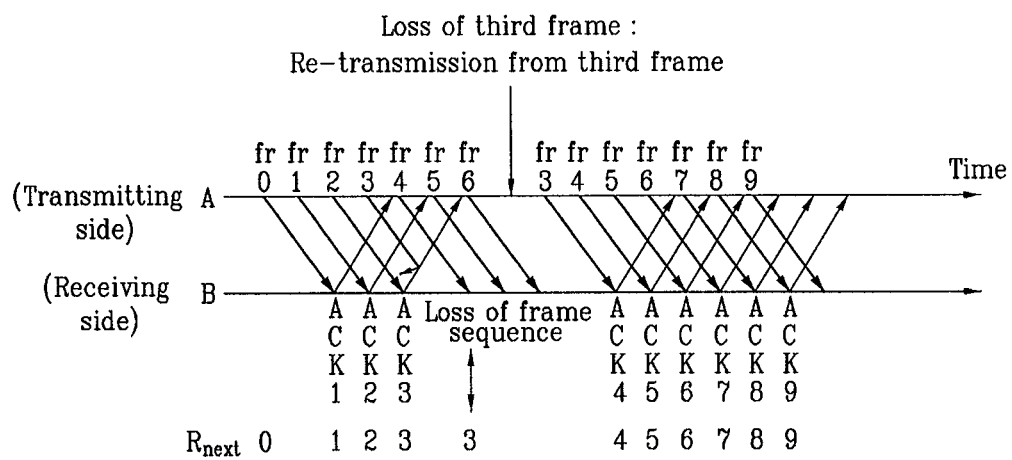
FIG. 2 illustrates a go-back-N (GBN) ARQ scheme according to a prior art.
Figure 3:
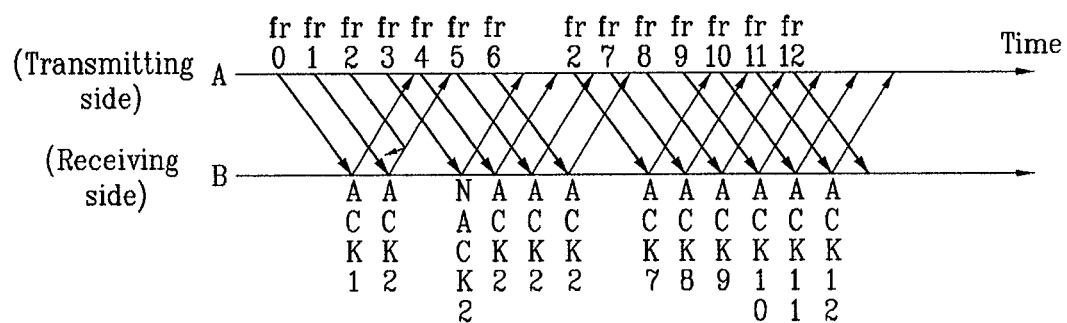
FIG. 3 illustrates a selective repeat (SR) ARQ scheme according to a prior art.

The embodiments of the present invention provide a method of reliably transmitting and receiving data and reducing a time delay which may occur during data transmission. The present invention also provides a communication method of offering a high-quality service to a receiving side located at a cell boundary of one or more base stations only by minimum signal exchange between the base stations and the receiving side.

One feature of the embodiments of the present invention is to transmit to one more receiving sides data received from an upper layer by a mobile station located at a cell boundary by performing coding using a data processing method (for example, random linear coding).

Another feature of the embodiments of the present invention is to share by two or more base stations a coded block set transmitted by a mobile station located at a place where it is possible to communicate with two or more base stations. Therefore, even though a data block transmitted to any one base station has an error, original data can be restored by using a data block received by the other base station.

Still another feature of the embodiments of the present invention is to transmit the same original data received from an upper layer to a mobile station located at a cell boundary of one or more base stations by performing coding using a data processing method (for example, random linear coding).

Still yet another feature of the embodiments of the present invention is to generate coded block sets by using the same original data by one or more base stations and transmit the coded data block sets to a mobile station located at a cell boundary of the base stations. Then even though a data block transmitted by the mobile station has an error, a high-quality service can be provided to the mobile station only by simple signal exchange with the base stations.

Exemplary embodiments described hereinbelow are combined by elements and features of the present invention. The elements or features may be considered as selective ones unless otherwise mentioned. Each element or feature may be practiced without being combined with other elements or features. Further, an embodiment of the present invention may be constructed by combining parts of the elements and/or features. An order of operations described in embodiments of the present invention may be varied. Some constructions of any one embodiment may be included in another embodiment and may be replaced with corresponding constructions of another embodiment.

In exemplary embodiments of the present invention, a description is made of a data transmission and reception relationship between a base station and a terminal. Here, the base station has a meaning as a terminal node of a network communicating directly with the mobile station. In some cases, a specific operation described as performed by the base station may be performed by an upper node of the base station.

Namely, it is apparent that, in a network comprised of a plurality of network nodes including a base station, various operations performed for communication with a terminal may be performed by the base station or other network nodes except for the base node. The term 'base station' may be replaced by a fixed station, a Node B, an eNode B (eNB) or an access point, etc. The term 'terminal' may be replaced by a user equipment (UE), a mobile station (MS), a mobile subscriber station (MSS), etc.

Embodiments of the present invention may be achieved by various means, for example, hardware, firmware, software, or a combination thereof.

In a hardware configuration, a method according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to exemplary embodiments of the present invention may be achieved by a module, a procedure, a function, etc. performing the above-described functions or operations. A software code may be driven by a processor stored in a memory unit. The memory unit is located at the interior or exterior of the processor and may transmit and receive data with the processor by the known various means.

The term 'transmitting side' used in exemplary embodiments of the present invention means all equipment or means for transmitting data, and the term 'receiving side' means all equipment or means for receiving data transmitted by the transmitting side. For example, a base station may be the transmitting side and a mobile station may be the receiving side in downlink data transmission. Similarly mobile station may be the transmitting side and a base terminal may be the receiving side in uplink data transmission.

The following detailed description includes specific details in order to provide a thorough understanding of the present invention. However, it will be apparent to those skilled in the art that the present invention may be practiced without such specific details. For example, the present invention may be broadly considered even in a wired system as well as a wireless system.

Figure 4:
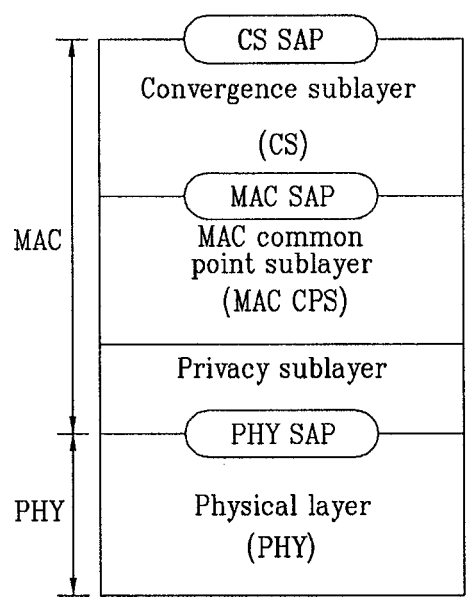
FIG. 4 illustrates an example of a protocol layer configuration used in an IEEE 802.16 system.

FIG. 4 is a diagram illustrating an example of a protocol layer configuration used in an IEEE 802.16 system.

Referring to FIG. 4, an upper layer of a transmitting side, such as an IP layer, ATM, or Ethernet, transmits data in the form of a service data unit (SDU) to a medium access control (MAC) common point sublayer (CPS) through a convergence sublayer (CS) service access point (SAP) and a MAC SAP.

In the MAC CPS, the SDU is processed to a MAC protocol data unit (PDU). The SDU may be processed to a PDU according to a data processing method of an exemplary embodiment of the present invention. A security encryption is added to the MAC PDU in a privacy sublayer and the MAC PDU is transmitted to a physical (PHY) layer through a physical SAP. The physical layer performs an operation for transmitting the processed PDU to a wireless or wired area. In the exemplary embodiments of the present invention, the MAC PDU is used as the term for 'data block'. However, the MAC PDU may be replaced by other appropriate terms.

The physical layer of a receiving side receives the MAC PDU transmitted by the transmitting side in a wireless or wired area and transmits the MAC PDU to the MAC CPS through the Physical SAP. The MAC CPS restores original information data by a data processing method proposed by an exemplary embodiment of the present invention. The restored data is transmitted to an upper layer through the MAC SAP. The receiving side performs an ARQ operation according to a data receiving state and transmits an ACK signal and/or a NACK signal to the transmitting side.

An area where a data processing method and a data re-transmission method are used is the MAC CPS. In the MAC CPS, a data processing process such as data encoding and/or decoding is performed. Furthermore, an ARQ operation may be implemented in the MAC CPS. The data re-transmission method proposed by exemplary embodiments of the present invention may also be implemented in the MAC CPS.

However, a 'head' necessary for protocol processing per layer in a protocol stack is added to data. Even though data is transmitted through a different layer, each protocol layer may be represented as communicating with the same layer by confirming information contained in the head. A data processing method by the transmitting side and the receiving side will be described in brief in the case where the data processing method and data re-transmission method are used in the MAC CPS of each of the transmitting side and the receiving side.

Figure 5:
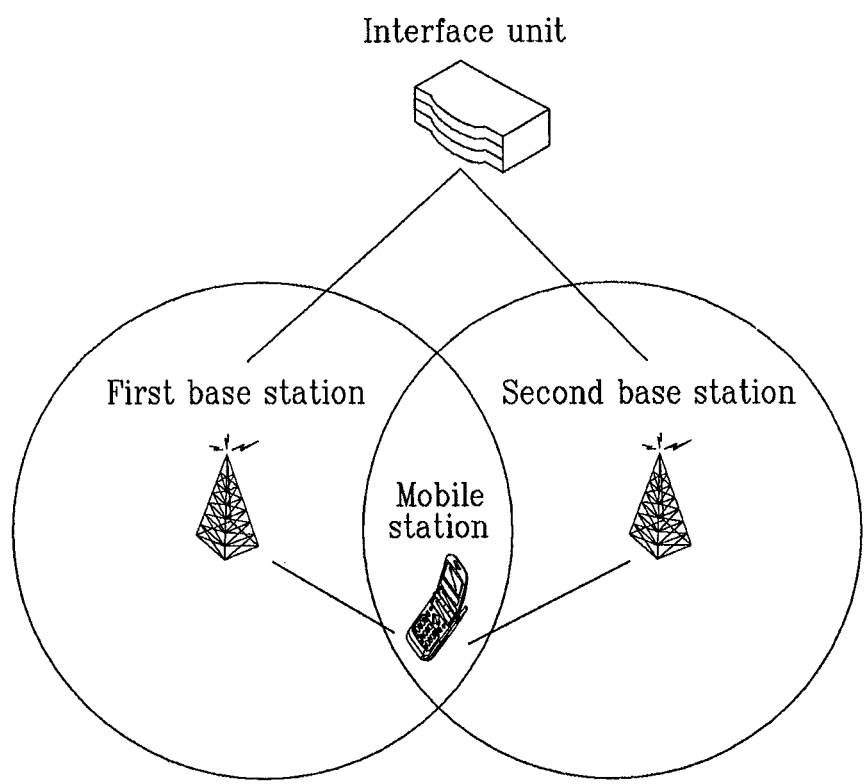
FIG. 5 illustrates an example of a network environment in which exemplary embodiments of the present invention are operated.

FIG. 5 is a diagram for explaining an example of a network environment in which exemplary embodiments of the present invention are operated.

Referring to FIG. 5, a mobile station may be located at a cell boundary of a first base station or a place capable of communicating with two or more base stations. For example, the mobile station may be located at a cell boundary of the first base station or a cell boundary of a second base station. Then the mobile station can receive signals transmitted from both the first base station and the second base station. Moreover, the mobile station can transmit signals to both the first base station and the second base station.

The first and second base stations may be connected to each other through an interface unit including an upper router or a base station controller. Therefore, the first and second base stations may transmit and receive data through a backbone network. Any one of the first and second base stations may control the other base station as a serving base station (or a master base station) or receive information from the other base station to share the information. The following exemplary embodiments of the present invention may be applied to the above-described communication environment.

Figure 6A:
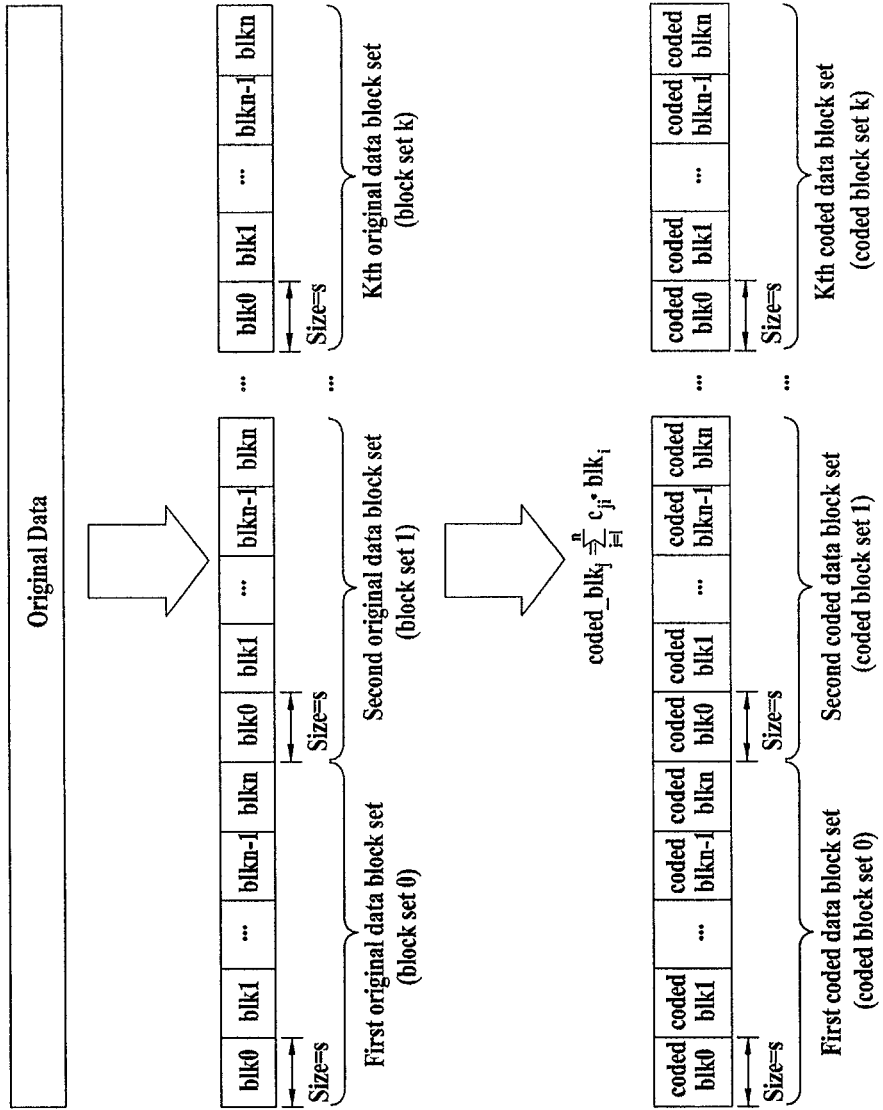
FIG. 6a illustrates a data processing method according to an exemplary embodiment of the present invention

FIG. 6a illustrates a data processing method according to an exemplary embodiment of the present invention.

One of the data processing methods applicable to exemplary embodiment of the present invention is random linear coding. A method of processing a data block by using the random linear coding by a transmitting side is as follows.

To apply the random linear coding, the transmitting side divides an SDU into one or more data blocks. The transmitting side configures a data block set by selecting data blocks of a predetermined number (n) among the divided data blocks. In this case, the number (n) of data blocks contained in the data block set may be determined by a channel environment of a communication network, performance information of transmitting and receiving sides, or requirements of an application program.

The transmitting side generates a coefficient matrix to encode the divided data blocks. The transmitting side encodes the divided data blocks by multiplying the divided data blocks by a coefficient matrix generated according to a predetermine rule or by using other operation methods. The random linear coding refers to such a data processing method.

Hereinafter, a data block coded by using the random linear coding is referred to as a coded block and a coded data block set is referred to as a coded block set.

In the exemplary embodiment of the present invention, one of data processing methods is random linear decoding. A method of processing a data block using the random linear decoding will now be described.

The random linear decoding may be used in the course of a data processing process of a communication system of a receiving side. The receiving side sequentially receives a coded block from the transmitting side. The receiving side also receives a coefficient matrix necessary for decoding from the transmitting side. The receiving side decodes the coded block to a data block by using an inverse matrix of the coefficient matrix. Alternatively, the receiving side may perform a decoding process by using other operation methods.

The coefficient matrix used for the random linear coding and random linear decoding methods may be generated by using random numbers having a predetermined range determined by the transmitting side or the transmitting and receiving sides. The random numbers indicate randomly extracted numbers within a given range (for example, from 0 to 255) determined by the transmitting side or the transmitting and receiving sides.

Alternatively, the matrix coefficient may be generated by using a seed value necessary for generating a coefficient. The following Table 1 shows one example of generating the coefficient matrix by using the seed value.

TABLE 1

| Syntax | Contents |
|---|---|
| const int m = (2 << 30) − 1;<br>const int a = 16807;<br>const int q = m / a;<br>const int r = m % a;<br>double Random::rand(void)<br>{<br>  double z;<br>  seed = a * (seed % q) − r * (seed / q);<br>  if (seed <= 0)<br>  seed = seed + m;<br>  z = (seed * 1.0) / m;<br>  return z;<br>}<br>void Random::initialize(void)<br>{<br>  Timestamp c;<br>  c.setnow( );<br>  seed = (int) c.getUsecs( );<br>} | |

The transmitting side may generate the coefficient matrix using the above Table 1. The transmitting side extracts the seed value for a current time and generates a rand (void) function based on the seed value. The transmitting side completes the coefficient matrix by using a final value generated through the rand function.

The receiving side performs random linear decoding by using the inverse matrix of the coefficient matrix. If the receiving side previously knows the seed value, the receiving side calculates the final value by using the rand function. The receiving side generates the coefficient matrix used during coding by using the final value and performs decoding by using the coefficient matrix. Therefore, the receiving side can restore original data by the seed value even though the receiving side does not know the entire value of the coefficient matrix.

The random linear coding and decoding methods are terms defining the data processing method proposed according to the present invention and therefore terms designating the above methods may be variously modified.

The random linear coding and decoding methods will now be described in detail with reference to FIG. 6a. A transmitting side processes a service data unit (SDU) transferred from an upper layer to one or more protocol data units (PDUs).

In the exemplary embodiment of the present invention, the PDUs are referred to as an original data block 'blk'. The transmitting side divides the SDU transferred from an upper layer into small data blocks having a size 's' and selects n data blocks, thereby constructing an original data block set. The transmitting side may generate a coefficient matrix in the unit of the original data block set and code the original data blocks contained in the original data block set according to the coefficient matrix.

Hereinafter, a random linear coded data block is referred to as a coded block, and a set configured by n coded blocks is referred to as a coded data block set. However, those terms are just to describe the exemplary embodiments of the present invention and may be modified to terms of other forms.

A data processing method and interpreting method using the random linear coding and decoding proposed according to an exemplary embodiment of the present invention utilize a finite-field calculating method rather than a typical mathematical calculating method. However, other calculating methods may be used.

A communicative ring that a unit circle for multiplication exists and an element except for 0 has an inverse element for multiplication is called a field. A finite field means that the number of elements in the field is finite. A Galois field is one type of the finite field. In the exemplary embodiment of the present invention, the Galois field may be used. A Galois field having a size of $P^m$ may be represented as $GF(P^m)$.

Hereinafter, a calculating method for the Galois field is described.

The addition and multiplication in the finite field will be described by way of example of $GF(2^8)$. However, the present invention is not limited to $GF(2^8)$ and the Galois field of various types may be used. The addition and multiplication in the finite field are identical to an exclusive OR logical operation. Namely, the addition and subtraction between bits are the same as an XOR operation between bits.

Simple examples of an XOR operation can be represented by 1+1=0, 1+0=1, etc. In multiplication for the XOR operation, a primitive polynomial may be determined. For example, a primitive polynomial of $m(x)=x^8+x^4+x^3+x^2+1=0x11d(hex)$ may be used. It is apparent that other polynomials may be used as the primitive polynomial.

A multiplication may be expressed as a polynomial having a degree of 14 by multiplying polynomials representing two numbers. However, since the multiplication of polynomials does not exceed the degree of a finite field, a degree should be lowered by multiplying two polynomials and then dividing the obtained polynomial by a primitive polynomial. That is, a multiplication value should not exceed the maximum degree of the finite field.

An example of multiplying 183 by 83 is described. Polynomials of 183 and 83 in the finite field are $(x^7+x^5+x^4+x^2+1)$ and $(x^6+x^4+x^1+1)$, respectively. A multiplication of the two polynomials is $x^{13}+x^{10}+x^9+x^8+x^5+x^4+x^3+x^1$. Therefore, a remainder obtained by dividing the result value by a primitive polynomial is a final result value. In the above example, the final result value is 238 as a decimal number.

Hereinafter, examples of the random linear coding and decoding based on the above calculating method are described in detail.

A random linear coded block set $\overline{E}$ obtained by a process of an original data block $\overline{S}$ can be expressed as follows.

$$\overline{E} = \overline{H} \times \overline{S} \qquad \text{[Equation 1]}$$

where $\overline{H}$ is a coefficient matrix consisting of coefficients. The above Equation 1 shows a method of combining the original data block set. There may be many methods of generating the coefficient matrix. First, a transmitting side defines the size of the coefficient matrix as n×n according to the number (n) of data blocks contained a data block set. Next, the transmitting side constructs coefficients by random numbers to generate the coefficient matrix. The transmitting side generates the coefficient matrix by using the coefficients and transmits the coefficient matrix to a receiving side.

Another method is to share a seed value necessary for generating a random number. That is, if the receiving side previously knows the seed value used for generating the coefficient matrix by the transmitting side, the receiving side may generate the coefficient matrix again. For example, the transmitting side may generate the coefficient matrix by using the seed value and the rand function in Table 1. The receiving side then performs random linear decoding by using an inverse matrix of the coefficient matrix.

Still another method is to generate by the receiving side the coefficient matrix by a combination of connection identification (CID) information contained in a MAC header and a short seed in an IEEE 802.16 system.

When generating the coefficient matrix, the transmitting side can generate the coefficient matrix of n×n at a time. For instance, the transmitting side generates the matrix of n×n by generating a matrix of 1×n by n times. Therefore, one row of the coefficient matrix is used per coded block.

One exemplary embodiment of the random linear coding as one of data processing methods will now be described. If the size of an original data block is 100 bytes and a number '5' is selected as n, the size of the coefficient matrix is 5×5. An example of the coefficient matrix generated by randomly extracting a number of a given range (for instance, from 0 to 255) by the transmitting side is as follows.

$$H = \begin{pmatrix} 1 & 2 & 2 & 3 & 1 \\ 2 & 1 & 0 & 2 & 3 \\ 3 & 1 & 0 & 2 & 1 \\ 4 & 1 & 0 & 3 & 2 \\ 5 & 1 & 0 & 4 & 3 \end{pmatrix}$$

Using Equation 1, a coded block set $\overline{E}$ can be obtained by combining the coefficient matrix with an original data block set $\overline{S}$.

$$\overline{E} = \begin{pmatrix} E_1 \\ E_2 \\ E_3 \\ E_4 \\ E_5 \end{pmatrix} = \overline{H} \times \overline{S} = \begin{pmatrix} H_{11} & H_{12} & H_{13} & H_{14} & H_{15} \\ H_{21} & H_{22} & H_{23} & H_{24} & H_{25} \\ H_{31} & H_{32} & H_{33} & H_{34} & H_{35} \\ H_{41} & H_{42} & H_{43} & H_{44} & H_{45} \\ H_{51} & H_{52} & H_{53} & H_{54} & H_{55} \end{pmatrix} \times \begin{pmatrix} S_1 \\ S_2 \\ S_3 \\ S_4 \\ S_5 \end{pmatrix}$$

$$= \begin{pmatrix} 1 & 2 & 2 & 3 & 1 \\ 2 & 1 & 0 & 2 & 3 \\ 3 & 1 & 0 & 2 & 1 \\ 4 & 1 & 0 & 3 & 2 \\ 5 & 1 & 0 & 4 & 3 \end{pmatrix} \times \begin{pmatrix} S_1 \\ S_2 \\ S_3 \\ S_4 \\ S_5 \end{pmatrix}$$

$$\begin{pmatrix} 1 \times S1 + 2 \times S2 + 2 \times S3 + 3 \times S4 + 1 \times S5 \\ 2 \times S1 + 1 \times S2 + 0 \times S3 + 2 \times S4 + 3 \times S5 \\ 3 \times S1 + 1 \times S2 + 0 \times S3 + 2 \times S4 + 1 \times S5 \\ 4 \times S1 + 1 \times S2 + 0 \times S3 + 3 \times S4 + 2 \times S5 \\ 5 \times S1 + 1 \times S2 + 0 \times S3 + 4 \times S4 + 3 \times S5 \end{pmatrix}$$

Each random linear coded block includes all information of the original data block contained in the original data block set. A method of constructing the coded block set will not be described in brief.

The transmitting side forms a first row $E_1$ of the coded block set $\overline{E}$ by multiplying a first row of the coefficient matrix by all data blocks of the original data block set. The transmitting side also forms a second row $E_2$ of the coded block set $\overline{E}$ by multiplying a second row of the coefficient matrix by all data blocks of the original data block set. In this way, the transmitting side can construct the coded block set.

Since a description of the exemplary embodiment of the present invention is made by way of example of $GF(2^8=256)$ each data block may be operated in the unit of byte. For example, when the first values of S1, S2, S3, S4, and S5 are 80, 81, 82, 83, and 84 as ASCII values, respectively, the first row E1 of a coded matrix is expressed by:

$E1=80\times1+81\times2+82\times2+83\times3+84\times1=80+162+164+245+84=247$

Although S1 has been expressed as an ASCII value, it may be expressed as a vector value. For instance, it is possible to calculate S1, S2, S3, S4, and S5 by a binary vector value. In the IEEE 802.16 system, data blocks such as S1 and E1 are operated within the size range of 1 byte. However, other modifications may be applied.

A method of coding the data block can be generalized by the following Equation 2.

$$\text{coded\_blk}_j = \sum_{i=1}^{n} c_{ji} \cdot blk_i \qquad \text{[Equation 2]}$$

In Equation 2, coded_blk$_j$ is a general expression of a coded block, $c_{ji}$ is a general expression of a coefficient matrix, and blk$_i$ is an original data block. A random linear coding method can be generalized by the above Equation 2.

In Equation 2, a coded matrix $\overline{E}$ is formed by multiplying a coefficient matrix by an original data matrix. In this case, each coded block includes all information of an original data block. Therefore, even though a received coded block is lost or has an error, the receiving side can restore original data by receiving other coded blocks.

A random linear decoding method will now be described in detail as one of the data processing methods.

To apply the random linear decoding method, the receiving side should receive as many as n (in this example, 5) coded blocks corresponding to the number of original data blocks. While the receiving side performs decoding, the receiving side is not influenced by the receiving order of coded blocks but it is influenced by the number of received coded blocks.

For example, when receiving data blocks contained a first coded data block set coded by the receiving side, there is no problem in restoring original data even though the receiving side receives the data blocks in the order of blk 2, blk 0, blk 1, etc. However, if the number (n) of data blocks is 5, the receiving side should receive 5 coded blocks to restore the original data. Therefore, the receiving side should also receive data blocks blk 3 and blk 4 contained in the first coded data block set to decode the first data block set.

The transmitting side can generate at least one coded block by coding data transmitted from an upper layer by a random linear coding method. In this case, the transmitting side transmits at least one coded block to the receiving side. Upon receipt of a NACK signal from the receiving side, the transmitting side generates at least one different coded block by coding the original data again by the random linear coding method. The transmitting side transmits the different coded block to the receiving side.

To decode the coded block by the receiving side, a coefficient matrix used to code the data block by the transmitting side is needed. The receiving side can decode the received coded data by using the coefficient matrix. Hereinafter, a method of transmitting the coefficient matrix by the transmitting side is described.

FIG. 6b illustrates a method of transmitting a coefficient matrix according to an exemplary embodiment of the present invention.

There are various methods of transmitting a coefficient matrix. For example, each coefficient value of a matrix may be added to a coded data block header and then transmitted. The receiving side may rapidly re-construct a coefficient matrix by using the coefficient matrix contained the header. An example of adding the coefficient matrix to the data block header is shown in FIG. 6b.

FIG. 6c illustrates another method of transmitting a coefficient matrix according to an example of the present invention.

The transmitting side may add a seed necessary for generating a coefficient matrix to a coded data block and transmits the coded data block in which the seed is included to the receiving side. The receiving side can again generate the coefficient matrix by using the seed.

The transmitting side transmits a coded block set to the receiving side through a communication channel. The receiving side uses the following Equation 3 to decode the coded block.

$$\overline{S} = \overline{H}^{-1} \times \overline{E} \qquad \text{[Equation 3]}$$

Upon receipt of n coded blocks corresponding to the number (n) of previously set data block sets, the receiving side can restore original data by using Equation 3. In Equation 3, $\overline{H}^{-1}$ represents an inverse matrix of a coefficient matrix or an inverse matrix of a coefficient matrix re-generated by a seed value. However, it is also possible to obtain $\overline{S}$ by using a Gaussian elimination method without using the inverse matrix $\overline{H}^{-1}$.

A coded block may be degraded or lost by a channel environment, etc. during transmission. Then the receiving side requests the transmitting side to transmit another coded block. The transmitting side re-generates the coded block and transmits the re-generated coded block to the receiving side.

The receiving side can restore original data upon receipt of coded blocks corresponding to the number of coded blocks negotiated with the transmitting side at or before a communication start time point or upon receipt of coded blocks corresponding to the ordered number (for example, n) of coded blocks received during communication.

Hereinafter, a specific example to which random linear coding and decoding used in embodiments of the present invention is applied is described.

The transmitting side may transmit a message 'HELLOWORLD' to the receiving side. Then the transmitting side constructs an original data block set $\overline{S}$, a coefficient matrix $\overline{H}$, and the number (n) of data blocks as follows.

S1="HELLO"
S2="WORLD"
n=2

$$\overline{H} = \begin{pmatrix} 31 & 5 \\ 6 & 1 \end{pmatrix}$$

Each character within the data block is expressed as ASCII values as follows.
S1=72, 69, 76, 76, 79
S2=87, 79, 82, 76, 68
A coded block set made by processing the original data block set as follows.

$$\overline{E} = \begin{pmatrix} E_1 \\ E_2 \end{pmatrix} = \overline{H} \times \overline{S} = \begin{pmatrix} H_{11} & H_{12} \\ H_{21} & H_{22} \end{pmatrix} \times \begin{pmatrix} S_1 \\ S_2 \end{pmatrix} = \begin{pmatrix} 31 & 5 \\ 6 & 1 \end{pmatrix} \times \begin{pmatrix} S_1 \\ S_2 \end{pmatrix}$$

$$= \begin{pmatrix} 31 \times S1 + 5 \times S2 \\ 6 \times S1 + 1 \times S2 \end{pmatrix}$$

$$E_1 = \begin{pmatrix} 31 \times 72 + 5 \times 87, \\ 31 \times 69 + 5 \times 79, \\ 31 \times 76 + 5 \times 82, \\ 31 \times 76 + 5 \times 76, \\ 31 \times 79 + 5 \times 68 \end{pmatrix}$$

$$= (125, 158, 16, 118, 127)$$

$$E_2 = \begin{pmatrix} 6 \times 72 + 1 \times 87, \\ 6 \times 69 + 1 \times 79, \\ 6 \times 76 + 1 \times 82, \\ 6 \times 76 + 1 \times 76, \\ 6 \times 79 + 1 \times 68 \end{pmatrix}$$

$$= (250, 204, 231, 249, 251)$$

Data blocks E1 and E2 of a coded block set $\overline{E}$ are a combination of original data blocks S1 and S2 and a coefficient matrix. Therefore, each coded block includes all information of the original data block.

A process of receiving the coded block set and decoding the original data block by the receiving side is as follows.

$$\overline{S} = \begin{pmatrix} S_1 \\ S_2 \end{pmatrix} = \overline{H}^{-1} \times \overline{E} = \begin{pmatrix} H_{11} & H_{12} \\ H_{21} & H_{22} \end{pmatrix}^{-1} \times \begin{pmatrix} E_1 \\ E_2 \end{pmatrix}$$

$$= \begin{pmatrix} 1 & 5 \\ 6 & 31 \end{pmatrix} \times \begin{pmatrix} 125 & 158 & 16 & 118 & 127 \\ 250 & 204 & 231 & 249 & 251 \end{pmatrix}$$

$$S_1 = \begin{pmatrix} 1 \times 125 + 5 \times 250, \\ 1 \times 158 + 5 \times 204, \\ 1 \times 16 + 5 \times 231, \\ 1 \times 118 + 5 \times 249, \\ 1 \times 127 + 5 \times 251 \end{pmatrix}$$

$$= (72, 69, 76, 76, 79)$$

$$S_2 = \begin{pmatrix} 6 \times 125 + 31 \times 250, \\ 6 \times 158 + 31 \times 204, \\ 6 \times 16 + 31 \times 231, \\ 6 \times 118 + 31 \times 231, \\ 6 \times 118 + 31 \times 249, \\ 6 \times 127 + 31 \times 251 \end{pmatrix}$$

$$= (87, 79, 82, 76, 68)$$

Namely, the receiving side restores the original data block set $\overline{S}$ by using Equation 3. Accordingly, the receiving side can confirm whether the restored information is the same as information which is scheduled to be transmitted by the transmitting side. A calculating process of the random linear coding and decoding methods may be calculated in the above-described finite field (for, example, a Gallois field).

<Method of Re-transmitting Uplink Data>

Hereinafter, a method of re-transmitting uplink data is described.

Figure 7:
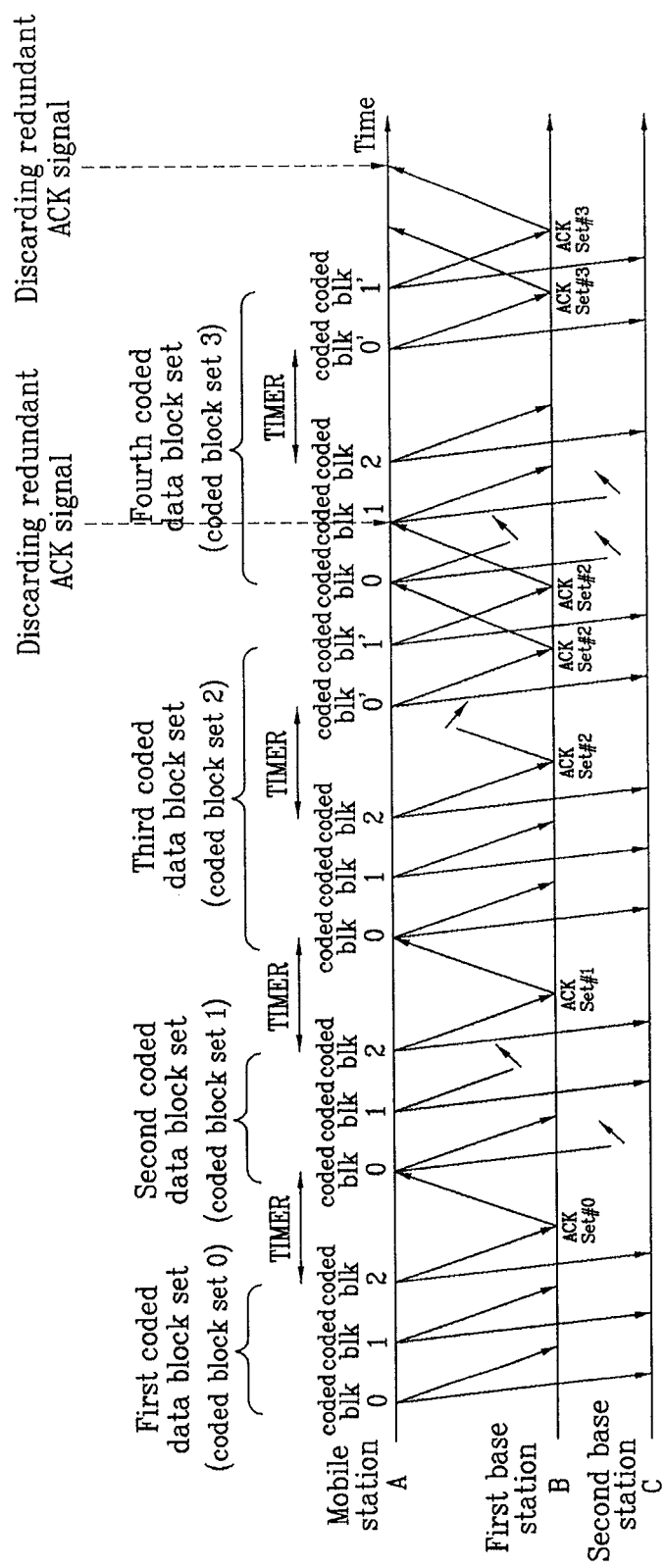
FIG. 7 illustrates a data communication method between a mobile station and one or more base stations according to a first exemplary embodiment of the present invention.

FIG. 7 illustrates a method of re-transmitting uplink data between a mobile station and one or more base stations according to an exemplary embodiment of the present invention.

A data re-transmitting method described with reference to FIG. 7 may be applied to the network environment shown in FIG. 5. In FIG. 7, a mobile station A performs data communication at a cell boundary of base stations B and C. It is assumed that a first base station is a serving (or master) base station and a second base station is an adjacent base station. However, those expressions and assumption may be varied.

The mobile station (a transmitting side) codes original data received from an upper layer in the unit of data block set. Desirably, the mobile station codes data received from an upper layer by using the random linear coding method described with reference to FIG. 6a. If the number (n) of data blocks contained in the data block set is 3, the mobile station generates a first coded data block set (coded block set 0) including 3 coded blocks by using the random linear coding.

The mobile station A transmits coded blocks (coded blk 0, coded blk 1, and coded blk 2) contained in coded block set 0 to the first base station B and the second base station C. In this case, the mobile station operates a timer after transmitting the last coded block (coded blk 2).

If the first and second base stations normally receive the 3 coded blocks, the first and second base stations can perform decoding in the unit of coded block set. To this end, the base stations use the random linear decoding method described with reference to FIG. 6a.

The first base station (serving base station) transmits an ACK signal to the mobile station, because restoration of original data has been successful. Instead of the serving base station, the second base station which is an adjacent base station may transmit the ACK signal to the mobile station.

Upon receipt of the ACK signal during a timer interval, the mobile station judges that data has been normally transmitted. Therefore, the mobile station codes a second data block set (original block set 1) to a second coded block set (coded block set 1). The mobile station transmits coded blocks (coded blk 0, coded blk 1, and coded blk 2) contained in coded block set 1 to the first and second base stations.

While the mobile station transmits the second coded block set (coded block set 1), it is assumed that the first base station normally receives only coded blk 0 and coded blk 2 and the second base station normally receives only coded blk 1 and coded blk 2, as shown.

In this case, the first and second base stations are connected to each other by the interface unit such as an upper router or a base station controller as described with reference to FIG. 5. That is, the first and second base stations can share much information such as data blocks through a backbone network.

Accordingly, even though the first base station does not normally receive coded blk 1, the first base station can receives coded blk 1 from the second base station and can restore an original data block set. Similarly, the second base station receives coded blk 0 from the first base station and can restore the original data block set. In FIG. 7, it is assumed that the first base station of the serving base station receives coded blk 1 from the second base station. Therefore, the first base station successfully restores the second original data block set and then transmits an ACK signal to the mobile station in the unit of coded block set.

As described above, the first and second base stations can share information. Therefore, even though a part of coded blocks is not normally received from the mobile station, original data can be restored by mutual information exchange between base stations.

While the mobile station transmits the second coded block set (coded block set 1), the mobile station operates the timer after transmitting the last coded block (coded blk 2). If the mobile station receives the ACK signal in the unit of coded block set within a timer interval, the mobile station constructs a third coded block set (coded block set 2) by using the method described with reference to FIG. 6a.

While the mobile station transmits the third coded block set (coded block set 2), it is assumed that the base stations normally receive coded blocks contained in the data block set and restore the original data block set. However, if the ACK signal transmitted in the unit of data block set by the first base station is lost in a wireless or wired network and the mobile station does not receive the ACK signal within the range of the timer interval, the mobile station judges that the first and second base stations have not normally restored data.

The mobile station then generates a new coefficient matrix and codes the third data block set again by using the random linear coding. The mobile station codes data blocks blk 0', blk 1', ... until an ACK signal is received and transmits the data block blk 0' to the base stations.

When the first and second base stations receive blk 0', the first base station transmits the ACK signal to the mobile station, because data blocks contained in the restored second data block set have been transmitted. Upon receipt of the ACK signal, the mobile station constructs a fourth coded block set (coded block set 3). In this case, the mobile station previously generates coded blk 1' before receiving the ACK signal and transmits coded blk 1' to the first and second base stations of the receiving side. Therefore, the first base station transmits a redundant ACK signal with respect to coded blk 1' to the mobile station. Since the mobile station has previously generated coded block set 3, the mobile station disregards or discards the redundant ACK signal.

While the mobile station transmits coded block set 3, it is assumed that the first base station normally receives coded blk 1 and coded blk 2 but does not receive coded blk 0, and the second base station does not receive coded blk 0 and coded blk 1 but normally receives coded blk 2.

The first and second base stations can share information as illustrated in FIG. 5. However, if both the first base station and the second base station do not receive coded blk 0 while the mobile station transmits coded block set 3, the first base station can not restore original data, because the number of coded blocks received by the first base station does not satisfy the number (n=3) of independent coded blocks necessary for restoring the original data.

The mobile station operates the timer and waits for the ACK signal after transmitting coded blk 2. However, since the first and second base stations can not restore the original data, the first base station can not transmit the ACK signal. Therefore, the mobile station does not receive the ACK signal and the timer expires. The mobile station judges that the first and second base stations have not normally received a data block. The mobile station constructs the coded block again by using the original data until the ACK signal is received. Moreover, the mobile station transmits coded blocks (coded blk 0' and coded blk 1') to the first and second base stations until the ACK signal is received.

When the first and second base stations receive coded blk 0', they can restore the original data because the number of independent coded blocks is 3. Therefore, the first base station can transmit the ACK signal to the mobile station in the unit of coded block set. If the first base station receives coded blk 1', the first base station transmits a redundant ACK signal to the mobile station and the mobile station discards the redundant ACK signal.

Figure 8:
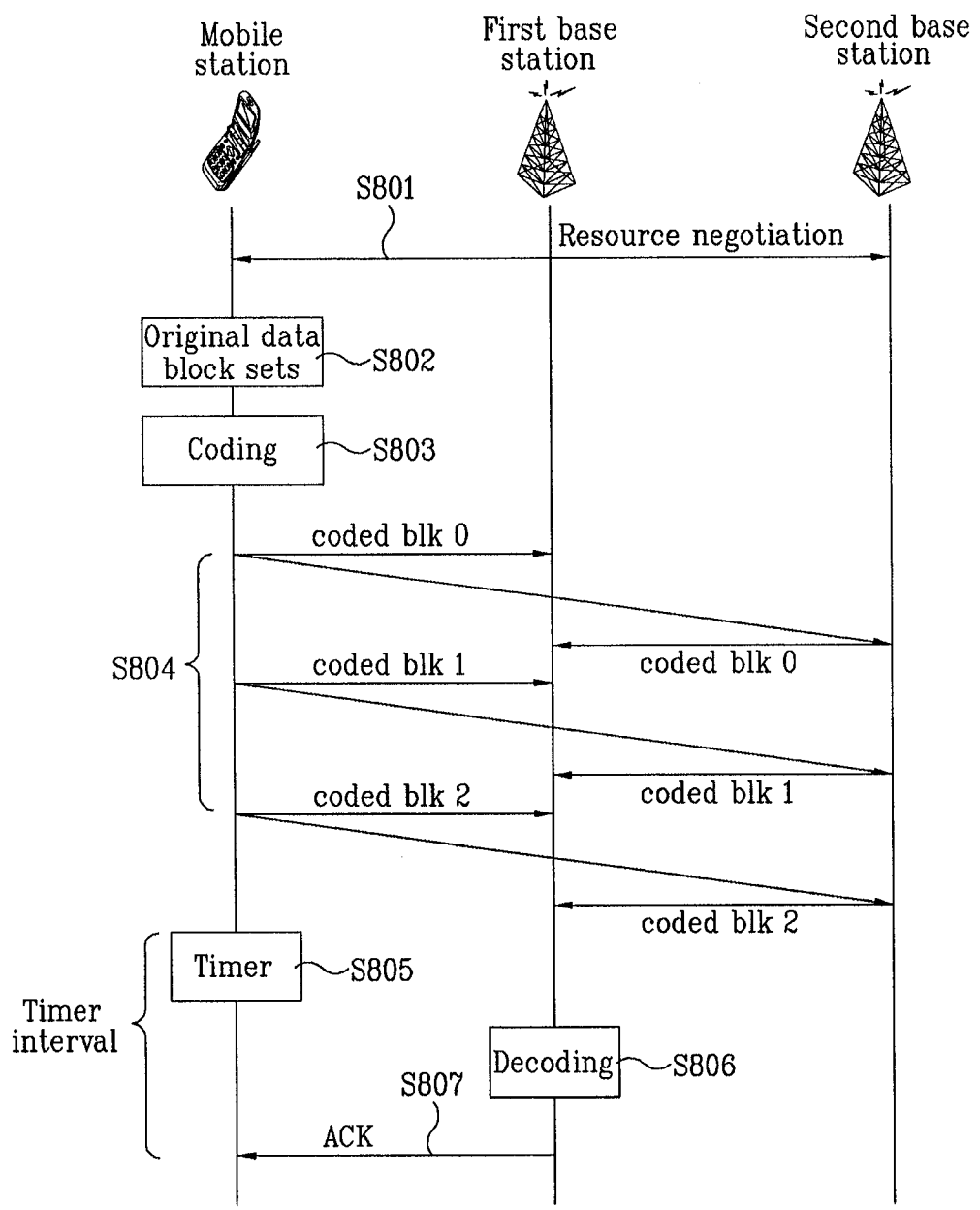
FIG. 8 illustrates a process of transmitting data to base stations by a mobile station according to an exemplary embodiment of the present invention.

FIG. 8 illustrates a process of transmitting data to base stations by a mobile station according to an exemplary embodiment of the present invention.

In more detail, FIG. 8 illustrates an example of uplink data communication while the mobile station transmits data information to base stations. It is assumed that the mobile station is simultaneously connected to both a first base station and a second base station.

To transmit data to the base stations, the mobile station should receive a wireless resource, etc. through resource negotiation with the base stations. That is, the wireless resources are allocated to the mobile station from the base stations through exchange of a control signal, etc. (S801).

In this case, the first and second base stations use a common identification or a common region. In a code division multiple access (CDMA) based communication environment for example, the first and second base stations can allocate a common code to the mobile station. In an orthogonal frequency division multiple access (OFDMA) based communication environment, a common region comprised of a subcarrier and a symbol is allocated to the mobile station. The mobile station performs data communication with the base stations through the allocated common identification or common region.

If a resource for uplink communication is allocated to the mobile station, the mobile station prepares data to be transmitted. Namely, the mobile station constructs one or more original data block sets by processing original data received from an upper layer to a medium access control layer (MAC) (S802).

The mobile station codes the original data block sets by using, desirably, the random linear coding described with reference to FIG. 6a. It is assumed in FIG. 8 that the number (n) of data blocks contained in a data block set is 3(S803).

Since the first and second base stations are connected to each other as described with reference to FIG. 5, the first and second base stations can exchange and share data information. It is assumed in FIG. 8 that the first base station is a serving base station and the second base station is an adjacent base station. However, the serving base station and the adjacent base station may be interchangeable.

The mobile station transmits respective coded blocks (coded blk 0, coded blk 1, and coded blk 2) to the first and second base stations through a wireless resource allocated from the first and second base stations.

The second base station transmits the coded block back to the first base station which is a serving base station whenever the second base station receives the coded block from the mobile station (S804).

In step S804, the second base station may transmit the coded blocks to the first base station at a time after receiving all coded blocks corresponding to the previously set number (n) of data blocks, according to a system condition or the setting of transmitting and receiving sides.

After transmitting the coded blocks corresponding to the number (n=3) of data blocks, the mobile station operates the timer (S805).

The first base station performs a decoding process by using the coded blocks received from the mobile station and the coded blocks received from the second base station (S806).

The number of data blocks transmitted to the first base station is 6 (3 data blocks from the mobile station plus 3 data blocks from the second base station). The number of data blocks necessary for decoding the original data by the first base station means the number of independent code blocks. Therefore, the number of the same code blocks is not included in the previously set number (n). However, since the number of independent data blocks received in step S804 by the first base station is 3, the original data can be restored.

Although a decoding process of step S806 may use various decoding methods, it is desirable to use the random linear decoding described with reference to FIG. 6a.

If the decoding process is successfully completed, the first base station transmits the restored original data block set to an upper layer and transmits an ACK signal to the mobile station in the unit of data block set (S807).

The mobile station can confirm that the original data block set has been successfully transmitted by receiving the ACK signal. The mobile station which has received the ACK signal from the first base station in a timer interval of step S805 repeatedly performs a procedure of FIG. 8 by using the next original data block set.

Figure 9:
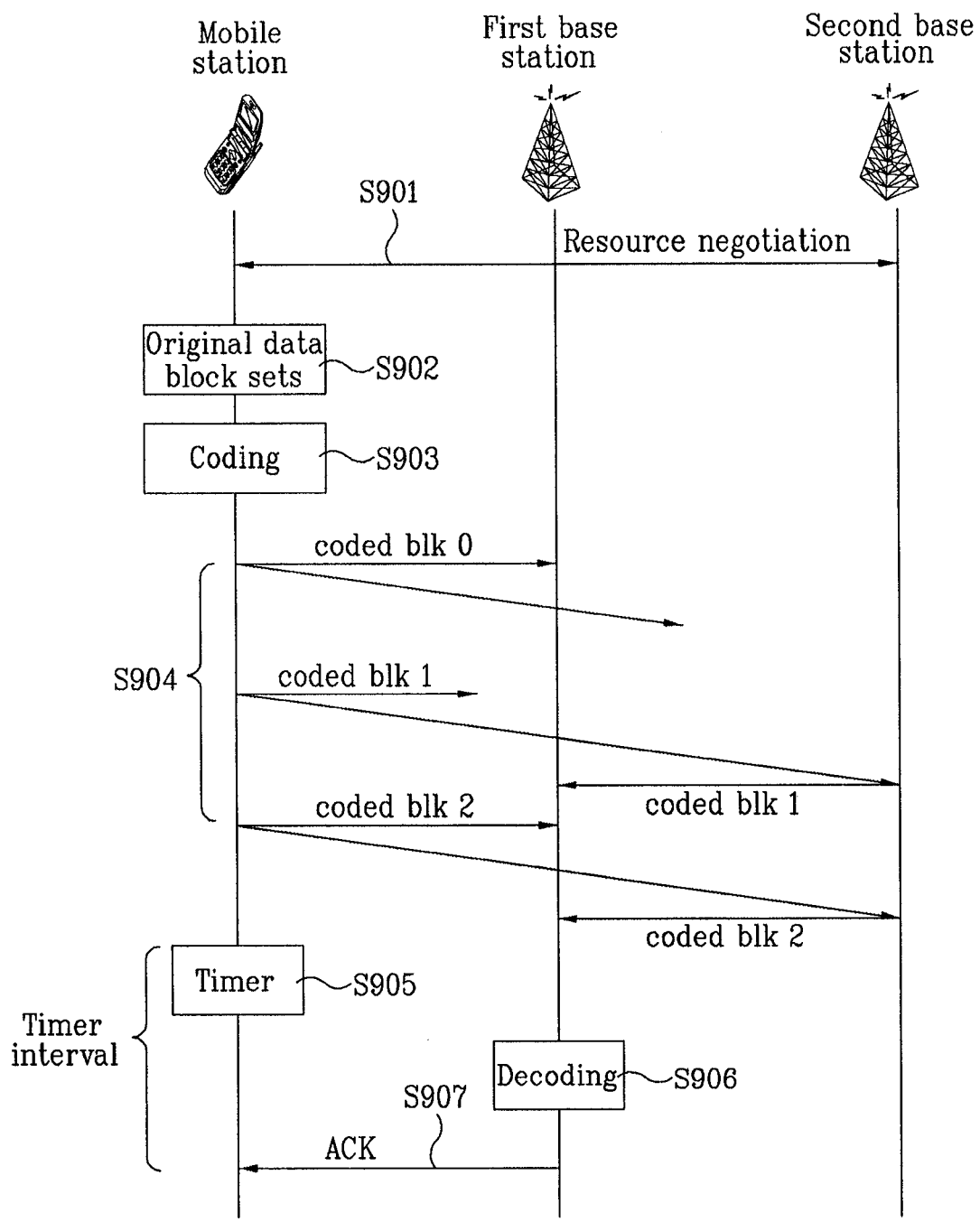
FIG. 9 illustrates a data communication method upon occurrence of an error while a mobile station transmits data to base stations according to an exemplary embodiment of the present invention.

FIG. 9 illustrates a data communication method upon occurrence of an error while the mobile station transmits data to base stations according to an exemplary embodiment of the present invention.

In more detail, FIG. 9 illustrates an uplink in which a mobile station transmits data to base stations under the communication environment shown in FIG. 5. The mobile station is simultaneously connected to both a first base station and a second base station. The first and second base stations can share data through, for example, a backbone network. Therefore, the second base station can transmit coded blocks received from the mobile station to the first base station.

To transmit data, wireless resources are allocated to the mobile station through resource negotiation between the mobile station and the base stations. That is, the mobile station receives the wireless resources from the base stations by exchanging a control signal, etc. with the base stations (S901).

If a resource for uplink communication is allocated to the mobile station, the mobile station prepares data to be transmitted. Namely, the mobile station constructs one or more original data block sets by processing original data received from an upper layer to a MAC (S902).

The mobile station codes the original data block sets by using, desirably, the random linear coding described with reference to FIG. 6a (S903).

It is assumed that the number (n) of data blocks contained in a data block set is 3.

The mobile station transmits respective coded blocks (coded blk 0, coded blk 1, and coded blk 2) to the first and second base stations through a wireless resource allocated from the first and second base stations (S904).

In step S904, the mobile station transmits the coded blocks (coded blk 0, coded blk 1, and coded blk 2) contained in the code block set to the base stations. It is assumed that coded blk 0 is normally transmitted to the first base station but lost while it is transmitted to the second base station. It is also assumed that coded blk 1 is normally transmitted to the second base station but not to the first base station.

The second base station transmits the received coded block (coded blk 1) to the first base station. Even though the coded block (coded blk 2) is successfully transmitted to the first and second base stations, the second base station transmits the received coded block (coded blk 2) to the first base station.

Although in step S904 the second base station transmits the data blocks to the first base station whenever receiving the data blocks from the mobile station, the second base station may transmit the coded blocks to the first base station at a time after receiving all the coded blocks.

After transmitting 3 coded blocks corresponding to the previously set number (n=3) of data blocks, the mobile station operates the timer (S905).

Since the second base station transmits the coded blocks received from the mobile station to the first base station in step S904, the first base station can directly receive the lost coded block (coded blk 1) from the second base station without receiving coded blk 1 from the mobile station.

Namely, the first base station receives the lost data block (coded blk 1) from the second base station so as to restore the original data without requesting the mobile station to re-transmit the lost data block. Hence, the first base station performs a decoding process of the original data block by receiving the lost coded block (coded blk 1) from the second base station (S906).

If the decoding process is completed, the first base station transmits the restored original data block set to an upper layer and transmits an ACK signal to the mobile station in the unit of data block set (S907).

Upon receipt of the ACK signal, the mobile station can confirm that all the data blocks (that is, 3 data blocks) contained in the original data block set have been normally transmitted to the base stations.

Then the mobile station constructs the next original data block set and repeatedly performs a procedure of FIG. 8. Accordingly, a process of restoring the original data by the first base station which is a serving base station is simplified and rapidly performed.

Figure 10:
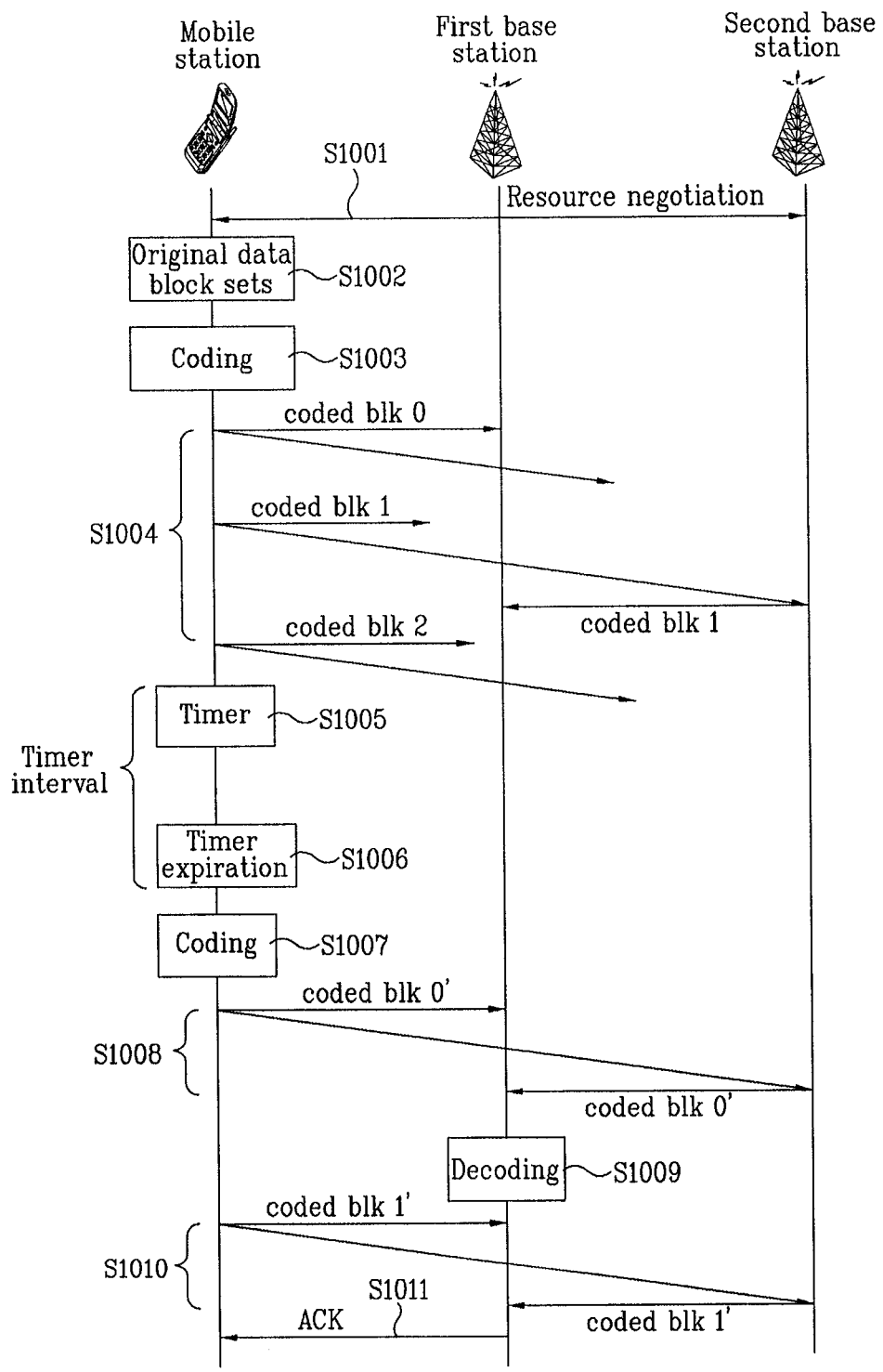
FIG. 10 illustrates a data communication method when original data can not be restored by occurrence of an error while a mobile station transmits data to base stations according to an exemplary embodiment of the present invention.

FIG. 10 illustrates a data communication method when original data can not be restored by occurrence of an error while a mobile station transmits data to base stations according to an exemplary embodiment of the present invention.

In more detail, FIG. 10 illustrates an uplink data communication method in the communication environment shown in FIG. 5. The mobile station is simultaneously connected to both a first base station and a second base station. The first and second base stations can transmit and receive data through, for example, a backbone network.

To transmit data to base stations from the mobile station, a wireless resource is allocated to the mobile station through resource negotiation between the mobile station and the base stations. That is, the mobile station receives the wireless resource through exchange of a control signal, etc. with the base stations (S1001).

If a wireless resource for uplink communication is allocated to the mobile station, the mobile station prepares data to be transmitted. For instance, the mobile station constructs one or more original data block sets by processing original data transmitted from an upper layer to a MAC layer (S1002).

The mobile station codes the original data block sets by using, desirably, the random linear coding described with reference to FIG. 6a. In this case, it is assumed that the number of data blocks contained in a data block set is 3 (S1003).

The mobile station transmits respective coded blocks (coded blk 0, coded blk 1, and coded blk 2) to the first and second base stations through a wireless resource allocated from the first and second base stations (S1004).

As shown in step S1004, the first base station normally receives coded blk 0 but does not receive the coded blk 1 and coded blk 2. The second base station normally receives coded blk 1 but does not receive coded blk 0 and coded blk 2. Then the second base station transmits the received coded block (coded blk 1) to the first base station which is a serving base station. However, a coded block (coded blk 2) is lost in a wired or wireless network and thus the first and second base stations do not receive coded blk 2.

After transmitting 3 coded blocks corresponding to the previously set number (n=3) of data blocks, the mobile station operates the timer (S1005).

The first base station which is a serving station constructs a data block set by combining coded blocks received from the first and second base stations. However, since neither the first base station nor the second base station has received coded blk 2, the first base station can not decode the original data block. Therefore, the first station can not transmit an ACK signal to the mobile station and a timer interval expires (S1006).

If the timer interval is ended under the state that the mobile station does not receive the ACK signal, the mobile station judges that the base stations have not normally received data. Therefore, the mobile station generates random linear coded blocks (coded blk 0', coded blk 1', . . . ) until the ACK signal is received (S1007).

The mobile station transmits the coded block (coded blk 0') to the first and second base stations. Since the first and second base stations are connected to each other, they share data information. Therefore, the second base station transmits coded blk 0' received from the mobile station to the first base station (S1008).

The first base station receiving coded blk 0' can acquire 3 independent code blocks (coded blk 0, coded blk 1, and coded blk 0'). Accordingly, the first base station can successfully restore the original data block set (S1009).

The first base station transmits the restored original data block set to an upper layer and transmits an ACK signal to the mobile station in the unit of coded block set (S1011).

However, transmission of the ACK signal may be delayed according to communication environments. Namely, it takes some time to transmit the ACK signal transmitted by the first base station to the mobile station. Therefore, the mobile station transmits coded blk 1' to the first and second base stations before receiving the ACK signal (S1010).

The first base station can know that coded blk 1' is the same data information as one contained in the data block set which has been successfully restored. Therefore, the first base station transmits a redundant ACK signal to the mobile station. The redundant ACK signal is to inform that data transmission has been completed. The mobile station disregards or discards the redundant ACK signal, because the ACK signal has already been received. After receiving the ACK signal, the mobile station constructs the next original data block set and repeats the process shown in FIG. 8.

Figure 11:
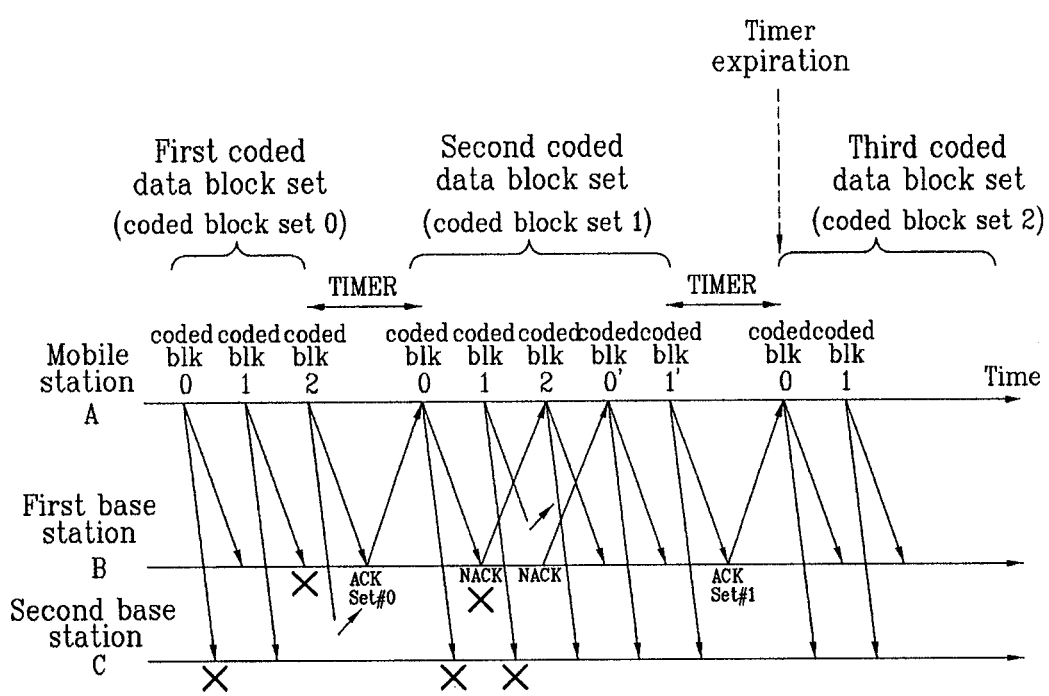
FIG. 11 illustrates a data communication method between a mobile station and one or more base stations according to another exemplary embodiment of the present invention.

FIG. 11 illustrates a data communication method between a mobile station and one or more base stations according to another exemplary embodiment of the present invention.

In FIG. 11, an example of data communication is illustrated between a mobile station A and base stations B and C under the network environment shown in FIG. 5.

The mobile station (transmitting side) codes original data received from an upper layer in the unit of data block set. It is assumed that the number (n) of data blocks contained in a data block set is 3. The mobile station may perform coding by using the random linear coding. The mobile station generates a first coded block set (coded block set 0) including 3 independent coded blocks according to the random linear coding.

The mobile station (A) transmits coded blocks (coded blk 0, coded blk 1, and coded blk 2) contained in the first coded block set to the first and second base stations B and C. It is assumed in FIG. 11 that the first base station is a serving base station (or a master base station) and the second base station is an adjacent base station.

Referring to FIG. 11, the mobile station transmits coded blocks to the first and second base stations. The mobile station operates a timer after transmitting the last coded block.

While the mobile station transmits the first coded block set, the first base station normally receives coded blk 0 and coded blk 2. However, coded blk 1 can not be used for decoding due to occurrence of an error. Moreover, the second base station normally receives coded blk 1. However, coded blk 0 transmitted to the second base station has an error so that it can not be used for decoding and coded blk 2 is lost in a wired or wireless network.

The second base station transmits the normally received data block (coded blk 1) to the first base station which is a serving base station. The second base station may transmit data blocks to the first base station whenever the data blocks are received. Alternatively, the second base station may transmit all the data blocks to the first base station after 3 coded blocks corresponding to the previously set number (n) of data blocks are all received.

The first base station receiving 3 independent coded blocks can restore a first original data block set. The first base station transmits an ACK signal to the mobile station in the unit of coded block set.

The mobile station receiving the ACK signal constructs a next second coded block set (coded block set 1) and transmits the second coded block set to the first and second base stations.

In the process of transmitting the second coded block set, it is assumed that the first base station normally receives coded blk 2 and coded blk 0 but coded blk 0 has an error. Further, the first base station does not receive coded blk 1 because coded blk 1 is lost in a wired or wireless network. It is also assumed that the second base station normally receives coded blk 2 but does not receive coded blk 0 and coded blk 1.

The first and second base stations are connected to each other as shown in FIG. 5 and share data information. Erroneous data except for normally received data can also be shared.

If data blocks transmitted to the first and second base stations have errors or if one data block is lost and the other data block has an error, the first base station B which is a serving base station transmits a NACK signal to the mobile station. However, if the coded block transmitted by the first base station is lost in a wired or wireless network and thus the first and second base stations do not receive the coded block, the first base station does not transmit the NACK signal to the mobile station.

Namely, in FIG. 11, since the first base station does not normally receive coded blk 0 and coded blk 1, the first base station transmits two NACK signals to the mobile station. The mobile station receiving the NACK signals generates new coded blocks (coded blk 0' and coded blk 1') corresponding to the number of NACK signals by using a second original data.

The mobile station transmits the newly generated coded blocks to the first and second base stations. The mobile station operates a timer after transmitting all coded blocks contained in the second coded block set.

The second base station transmits coded blk 0' and coded blk 1' transmitted by the mobile station to the first base station which is a serving base station immediately after receiving those coded blocks. Alternatively, the second base station may transmit coded blk 0' and coded blk 1' to the first base station after receiving 3 coded blocks corresponding to the number (n) of data blocks contained in the second coded data block set.

To restore the original data, the first base station is required to have 3 independent coded blocks. If new coded blocks (coded blk 0' and coded blk 1') are received, the first base station has 3 independent code blocks and thus the original data can be restored. Therefore, the first base station transmits an ACK signal to the mobile station.

After receiving the ACK signal from the first base station, the mobile station constructs a third coded block set (coded block set 2), thereby continuously performing data communication.

Figure 12:
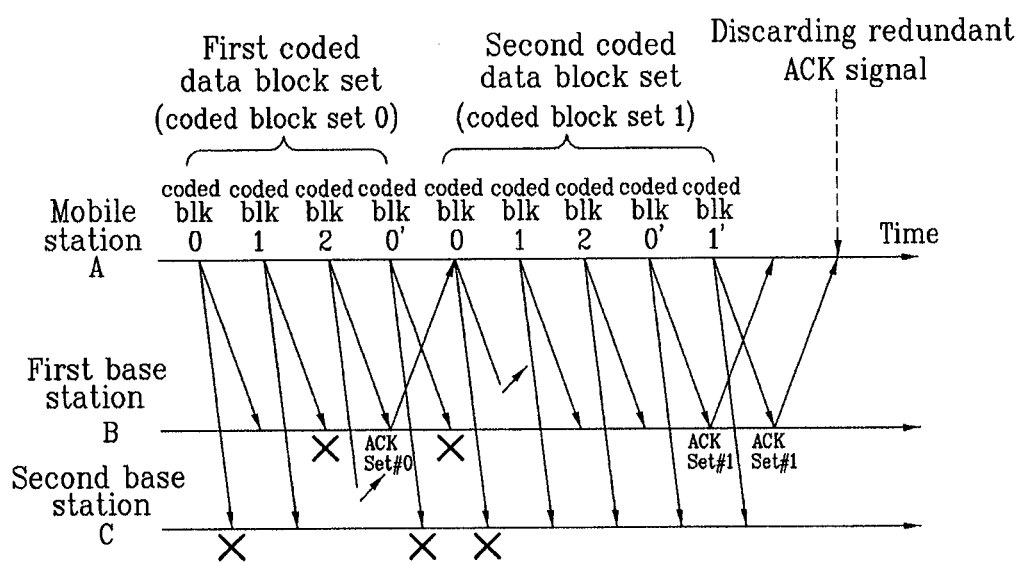
FIG. 12 illustrates a data communication method between a mobile station and one or more base stations according to still another exemplary embodiment of the present invention.

FIG. 12 illustrates a data communication method between a mobile station and one or more base stations according to still another exemplary embodiment of the present invention.

In FIG. 12, the mobile station does not have a timer and the base stations do not transmit a NACK signal even though an error is detected from a received coded data block. If original data can not be restored due to occurrence of an error, a corresponding data block set is discarded. The mobile station continues to generate a coded block until an ACK signal is received in the unit of data block set.

The network environment illustrated in FIG. 5 may be applied to the data communication method shown in FIG. 12 and the coding and decoding methods described with reference to FIGS. 6a to 6c may be applied thereto. It is assumed that the number (n) of data blocks contained in a data block set is 3. It is also assumed that the first base station is a serving base station (or a master base station) and a second base station is an adjacent base station.

The mobile station generates a first coded block set (coded block set 0) including 3 coded blocks according to the random linear coding. The mobile station transmits coded blocks (coded blk 0, coded blk 1, and coded blk 2) contained in the first coded block set to the first and second base stations.

The first base station normally receives coded blk 0 and coded blk 2 but a received coded block (coded blk 1) has an error so that it can not be used to restore the original data. The second base station normally receives coded blk 1 but an error is detected from coded blk 0 during a receiving process. The second base station does not receive coded blk 2, because it is lost in a wired or wireless network.

The second base station transmits the received coded blocks (coded blk 0 and coded blk 1) to the first base station of the serving base station. The second base station may transmit the coded blocks to the first base station each time the coded blocks are received from the mobile station. Alternatively, the second base station may transmit the coded blocks to the first base station at a time after 3 coded blocks are all received.

If the first base station receives coded blk 1 from the second base station, the original data can be restored, because the number of independent code blocks is 3. Therefore, the first base station transmits an ACK signal to the mobile station in the unit of data block set.

The mobile station generates coded blk 0' before receiving the ACK signal. The mobile station transmits coded blk 0' to the first and second base stations. If coded blk 0' is transmitted to the first and second base stations but has an error, the first and second base stations disregard or discard coded blk 0'.

The mobile station receiving the ACK signal judges that all data blocks to be transmitted have been normally transmitted. Then the mobile station constructs a next second coded block set (coded block set 1).

In the process of transmitting the second coded block set by the mobile station, it is assumed that the first base station normally receives coded blk 1 and coded blk 2 but does not receive coded blk 0, because it is lost in a wired or wireless network. It is also assumed that the second base station normally receives coded blk 1 and coded blk 2 but a received coded block (coded blk 0) has an error so that it can not be used to restore the original data.

Although the first and second base stations can share data information, the first base station does not receive coded blk 0 and the second base station can not use coded blk 0 for decoding. Therefore, even though the first base station receives the data blocks (coded blk 1 and coded blk 2) received by the second base station, the first base station can not restore the original data. This is similarly applied to the second base station.

Even after generating the second coded block set, the mobile station continues to generate new coded blocks (coded blk 0' and coded blk 1') which are included the second coded block set until an ACK signal is received. The mobile station transmits coded blk 0' and coded blk 1' to the first and second base stations until the ACK signal is received.

Upon receipt of coded blk 0' from the mobile station, the first base station can restore the original data, because the number of independent coded blocks is 3 (coded blk 1, coded blk 2, and coded blk 0'). Therefore, the first base station transmits an ACK signal to the mobile station in the unit of data block set. The mobile station receiving the ACK signal prepares a third data block (coded block set 2) by using the original data and performs a communication procedure shown in FIG. 12.

However, the mobile station transmits coded blk 1' before receiving the ACK signal due to a transmission delay of the ACK signal. Upon receipt of coded blk 1', the first base station transmits a redundant ACK signal to the mobile station to inform that data restoration has been completed. Since the mobile station has previously generated a third coded data block, the mobile station disregards or discards the redundant ACK signal.

<Downlink Communication Method>

Figure 13:
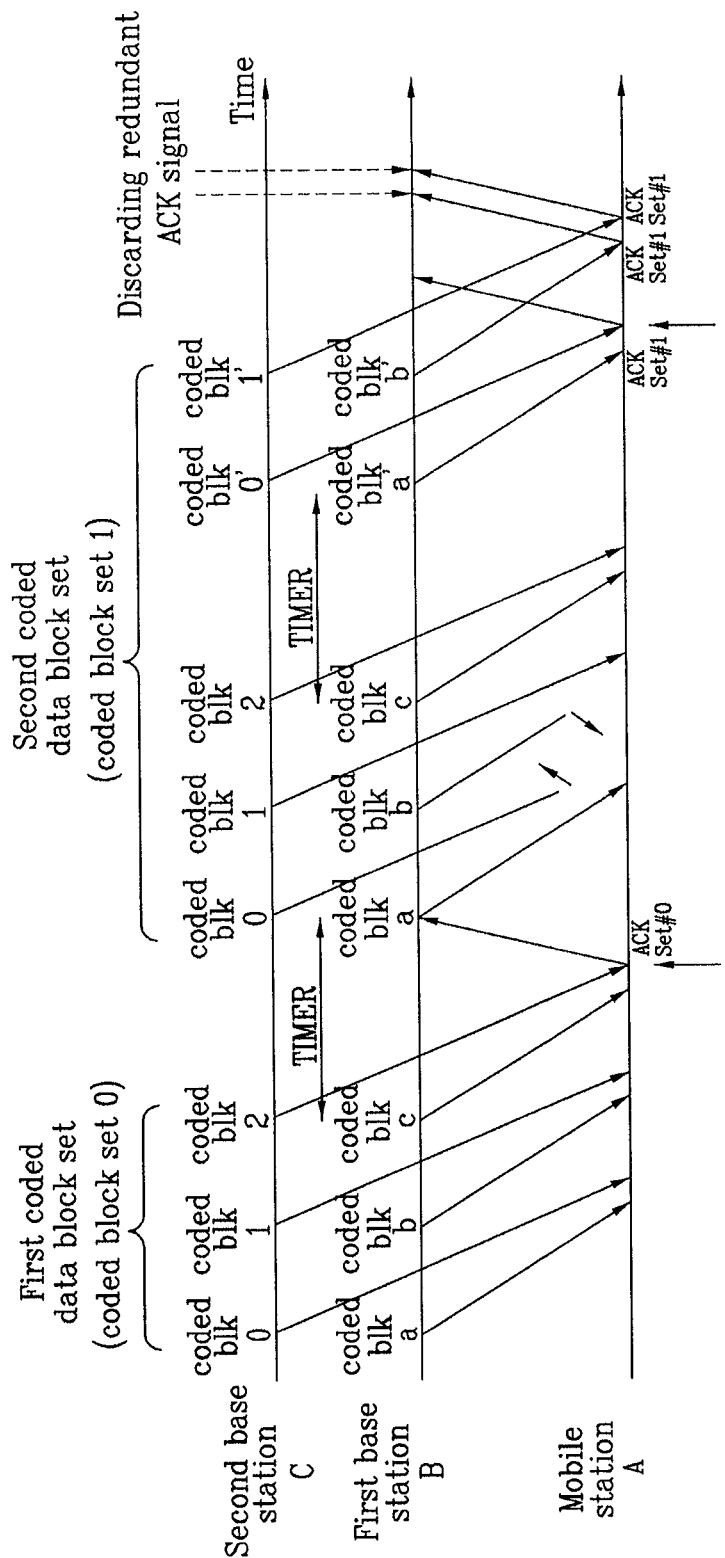
FIG. 13 illustrates a data communication method between one or more base stations and a receiving side according to still another exemplary embodiment of the present invention.

FIG. 13 illustrates a data communication method between one or more base stations and a receiving side according to still another exemplary embodiment of the present invention.

In FIG. 13, a data communication method between base stations B and C and a receiving side A in the network environment shown in FIG. 5.

One or more base stations (or, transmitting sides) can share original data received from an upper layer. The first base station B may be a serving base station and the second base station C may be an adjacent base station. Therefore, the first base station previously transmits the original data provided to the mobile station A to the second base station so that the second base station can offer a service to the mobile station A with the same data.

One or more base stations code the original data received from the upper layer in the unit of data block set. Desirably, each base station may code data received from the upper layer by using the random linear coding described with reference to FIG. 6a. It is assumed that the number (n) of data blocks contained in a data block set is 6. The number (n) of data blocks contained in each coded data block set may be determined by at least one of a channel environment of a communication network, performance of transmitting and receiving sides, and requirements of an application program.

Therefore, the base stations B and C generate a first coded block set (coded block set 0) coded by the random linear coding. The first coded block set includes 6 coded blocks (coded blk 0, coded blk 1, coded blk 2, coded blk a, coded blk b, and coded blk c).

The number of coded blocks transmitted to the mobile station by the first and second base stations may be determined by the first base station which is a serving base station and may inform the second base station of the number. Alternatively, the number of coded blocks may be determined by negotiation of the first and second base stations in consideration of a communication environment. In this case, a base station having a better communication environment with the mobile station may be set to transmit more code blocks than the other base station in consideration of a channel environment.

It is assumed that the first and second base stations transmit coded blocks of the same number (for example, 3). For instance, the first base station generates coded blk a, coded blk b, and coded blk c and the second base station generates coded blk 0, coded blk 1, and coded blk 2. The first and second base stations independently transmit the coded blocks to the mobile station.

It is assumed that, while the base stations transmit the first coded block set, the first base station transmits coded blk a, coded blk b, and coded blk c and the second base station transmits coded blk 0, coded blk 1, and coded blk 2. The first base station operates a timer after transmitting all data assigned thereto.

If the mobile station normally receives all coded blocks transmitted by the first and second base stations, since the number of independent coded blocks received by the mobile station is 6 (coded blk a, coded blk b, coded blk c, coded blk 0, coded blk 1, and coded blk 2), the mobile station can restore original data. If the mobile station successfully restores the original data, the mobile station transmits an ACK signal to the first base station which is a serving base station in the unit of data block set. The mobile station may transmit an ACK signal in the unit of data block set after receiving coded data or may transmit the ACK signal after restoring the received data to the original data, according to a communication system.

The ACK signal may be transmitted through a common wireless resource allocated to transmit the ACK signal so that both the first base station and the second base station can receive the ACK signal. If any one of the first and second base stations receives the ACK signal, a transmitting process is completed. Selectively, if a previously determined base station receives the ACK signal, the data transmitting process may be completed. It is assumed that the first base station which is a serving base station receives the ACK signal.

Each base station may operate a timer to receive the ACK signal after transmitting all data blocks assigned thereto. In this case, a timer of a previously determined base station may be used. It is assumed in FIG. 13 that a timer of the first base station of a serving base station is used.

In FIG. 13, the first base station receives an ACK signal from the mobile station during a timer interval. Therefore, the first and second base stations generate a next second coded block set (coded block set 1).

Referring to FIG. 13, while the first and second base stations transmit the second coded block set, coded blk 0 and coded blk b are lost in a wired or wireless network so that the mobile station does not receive coded blk 0 and coded blk b. Therefore, since the number of independent coded blocks received normally by the mobile station is 4 (coded blk a, coded blk c, coded blk 1, and coded blk 2), the previously set number (n=6) of data blocks is not satisfied. Therefore, the mobile station can not restore the original data.

The first base station operates a timer after transmitting all code blocks assigned thereto. However, since the mobile station can not restore the original data, it can not transmit the ACK signal. Therefore, the expiration time of the timer set by the first base station is terminated and the first base station judges that the mobile station has not normally received data. The first and second base stations are connected to each other as described with reference to FIG. 5 and can share a communication environment. Therefore, the first and second base stations re-construct coded blocks (coded blk 0', coded blk 1', coded blk a', and coded blk b') by using the original data.

The first and second base stations transmit the reconstructed coded blocks to the mobile station. If the mobile station receives coded blk 0' and coded blk a', the number of independent data blocks received by the mobile station is 6. Then the mobile station can restore the original data by using the random linear decoding method. Therefore, the mobile station can transmit the ACK signal to the first base station in the unit of data block set.

However, there is a transmission delay while the mobile station transmits the ACK signal, the first and second base stations continue to transmit coded blk a' and coded blk 1' to the mobile station before the ACK signal reaches the first base station. Upon receipt of coded blk a' and coded blk 1', the mobile station transmits a redundant ACK signal to the first base station, because successfully restored data has redundantly been received. The redundant ACK signal is identical to the ACK signal transmitted in the unit of data block set.

The first base station receiving the redundant ACK signal has already received the ACK signal in the unit of data block set and thus generates a next third coded block set. Alternatively, the first base station disregards or discards the redundant ACK signal, because the transmission of the original data has been completed.

While the base stations transmit the second coded block set, if the second base station has better channel environment than the first base station, coded blocks re-constructed by the second base station may be all transmitted to the mobile station.

Figure 14:
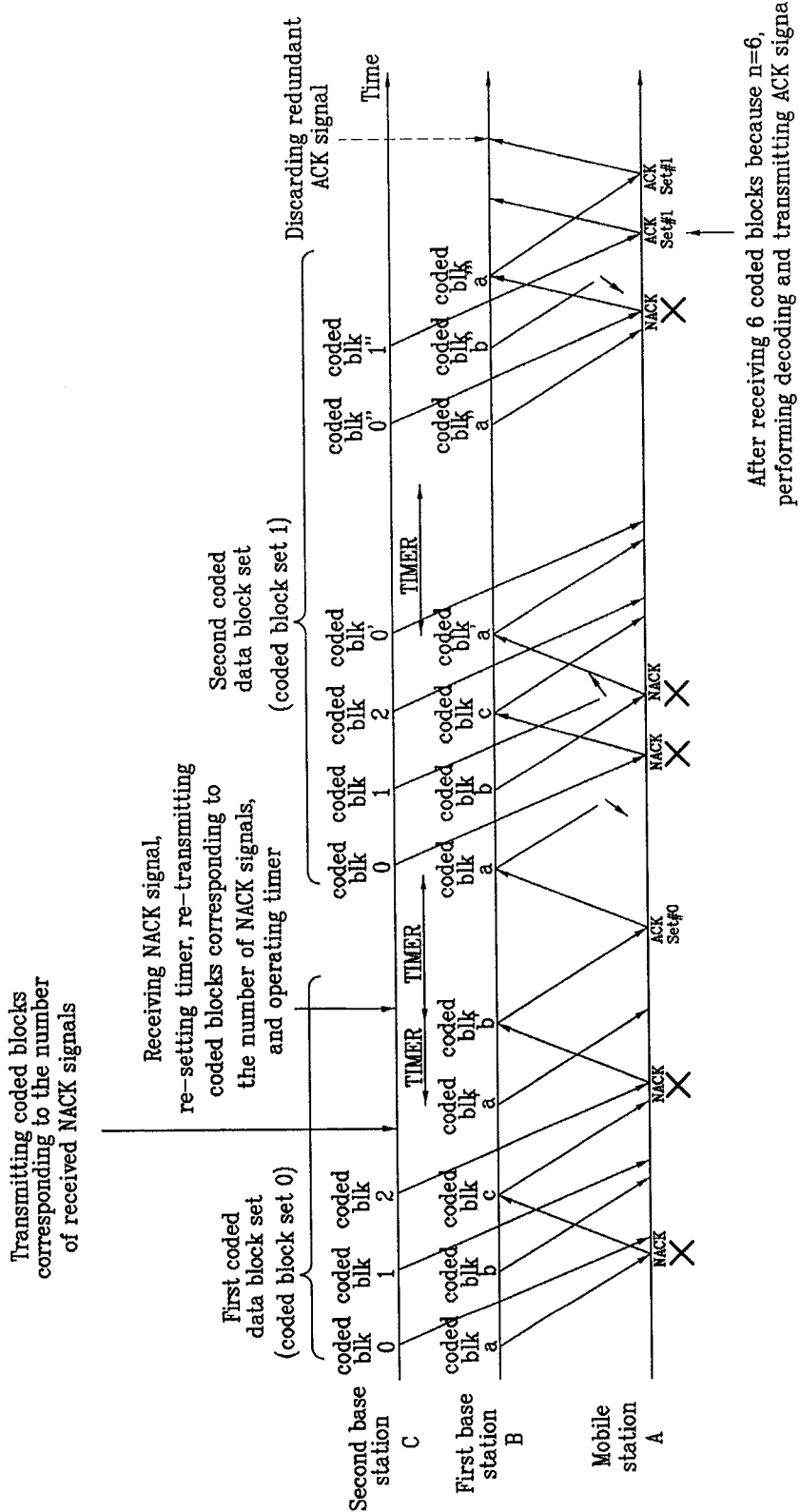
FIG. 14 illustrates a data communication method between a mobile station and one or more base stations according to still another exemplary embodiment of the present invention.

FIG. 14 illustrates a data communication method between one or more base stations and a receiving side according to a still another exemplary embodiment of the present invention.

In FIG. 14, there is shown an example of a data communication method between the base stations B and C and a receiving side A in the network environment illustrated in FIG. 5. A basic communication between one or more base stations and a receiving side is the same as in FIG. 13. However, the mobile station detects whether there is an error whenever a coded block is received. When detecting an error in a received coded block, the mobile station transmits a NACK signal to the one of base stations.

When coefficient matrixes of received coded blocks are dependent on each other, the mobile station transmits a NACK signal to the base stations. The mobile station performs a dependency test between rows of the coefficient matrixes of the received coded blocks. If the coefficient matrixes of the received coded blocks are not independent, the mobile station transmits a NACK signal and receives a new coded block. The reason why coefficient matrixes used to code a coded block by the mobile station should be independent is to use random linear coding and decoding. Therefore, the mobile station performs a dependency test whenever a coded block is received.

One or more base stations can share original data received from an upper layer as illustrated in FIG. 5. The first base station B may be a serving base station and the second base station may be an adjacent base station. Hence, the first base station can previously transmit original data provided to the mobile station A to the second base station. Consequently, the second base station also can provide the same data service to the mobile station A.

One or more base stations code the original data received from the upper layer in the data block set by using the random linear coding. It is assumed that the number (n) of data blocks contained in a data block set is 6.

Referring to FIG. 14, the first and second base stations B and C construct a first coded block set (coded block set 0) by using the original data. A basic setting method and a communication method are the same as in FIG. 13.

While the first and second base stations transmit the first coded block set to the mobile station, the first base station transmits coded blk a, coded blk b, and coded blk c and the second base station transmits coded blk 0, coded blk 1, and coded blk 2 to the mobile station. The first base station operates a timer after transmitting all data blocks. Selectively, one of the first and second base stations may operate the timer. In this exemplary embodiment, the first base station which is a serving base station operates the timer.

Although the mobile station receives coded blk a transmitted by the first base station and coded blk 2 transmitted by the second base station, if errors are detected from coded blk a and coded blk 2, the mobile station can not perform decoding. The mobile station transmits a NACK signal to the first base station which is a serving base station each time an error is detected.

Upon receipt of the NACK signal, the first base station re-sets the timer. The first base station re-constructs coded blocks (coded blk a' and coded blk b') corresponding to the number of received NACK signals and transmits the re-constructed coded blocks to the mobile station. After transmitting coded blk b', the first base station operates the timer again and waits for an ACK signal.

If the mobile station receives re-constructed coded blocks (coded blk a' and coded blk b') corresponding to the number of error detections from the first base station, the mobile station can restore the original data. Hence, the mobile station transmits an ACK signal to the first base station in the unit of data block set.

The first base station receiving the ACK signal constructs a second coded block set (coded block set 1).

While the first and second base stations transmit the second coded block set, coded blk a among coded blocks transmitted by the first base station is lost in a wired or wireless network and coded blk b is received by the mobile station but has an error. However, coded blk c is normally received by the mobile station. Among coded blocks transmitted by the second base station, coded blk 0 is received by the mobile station but has an error and coded blk 1 is lost in a wired or wireless network. However, coded blk 2 is normally received by the mobile station. Since errors are detected from coded blk b and coded blk 0, the mobile station transmits NACK signals to the first base station.

The first and second base stations re-construct coded blocks (coded blk a' and coded blk 0') from the original data with respect to the NACK signals received from the mobile station and transmit coded blk a' and coded blk 0' to the mobile station. After transmitting all coded blocks, the first base station operates the timer.

The number of coded blocks received from the first and second base stations by the mobile station is 4 (coded blk c, coded blk 2, coded blk 0', and coded blk a'). Since the number of independent data blocks received by the mobile station is not 6 corresponding to the previously set number (n=6) of data blocks, the mobile station can not restore the original data. Since the mobile station can not transmit an ACK signal to the first base station, the timer of the first base station expires.

Since the first base station has not received an ACK signal from the mobile station during a timer interval, the first base station judges that the mobile station has not normally received data. Therefore, the first and second base stations re-construct coded blocks (coded blk a", coded blk b", coded blk 0", coded blk 1") by using the original data.

If coded blk a" transmitted by the first base station is normally transmitted to the mobile station but coded blk 0" transmitted by the second base station has an error, the mobile station transmits a NACK signal to the first base station with respect to coded blk 0". Since the mobile station has received only 5 coded blocks, the original data can not be restored.

If coded blk b" transmitted by the first base station is lost in a wired or wireless network but coded blk 1" transmitted by the second base station is normally received by the mobile station, the number of coded blocks received by the mobile station is 6. Hence, the mobile station can restore the original data. Then the mobile station transmits an ACK signal to the first base station which is a serving base station in the unit of data block set.

The ACK signal transmitted by the mobile station cannot immediately be transmitted to the first base station due to a transmission delay. Therefore, the first base station transmits coded blk a'" re-constructed from the original data to the mobile station. Upon receipt of coded blk a'", the mobile station transmits a redundant ACK signal to the first base station, because the mobile station receives information including contents identical to successfully restored data. Since the first base station performs the next operation according to the already received ACK signal, the first base station disregards or discards the redundant ACK signal.

Figure 15:
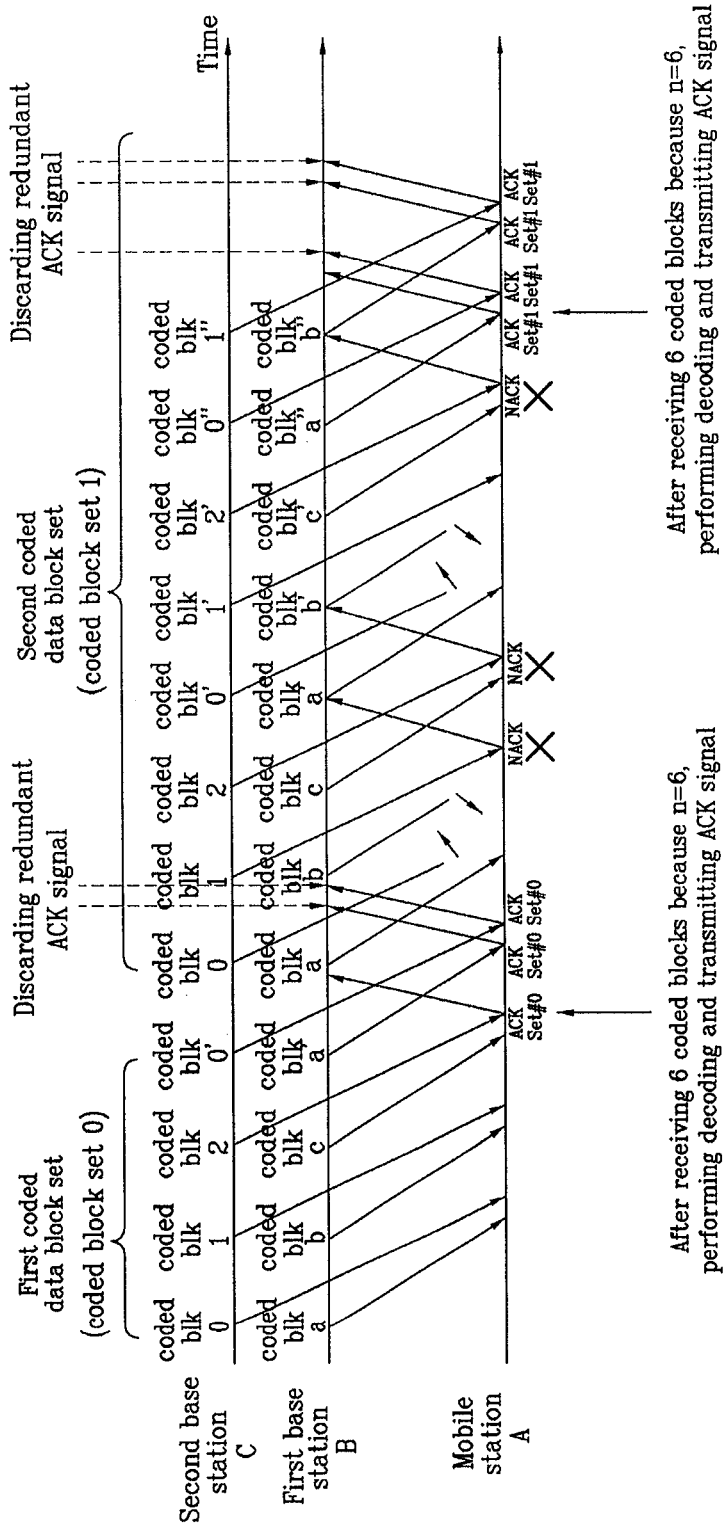
FIG. 15 illustrates a data communication method between a mobile station and one or more base stations according to still another exemplary embodiment of the present invention.

FIG. 15 illustrates a data communication method between one or more base stations and a receiving side according to still another exemplary embodiment of the present invention.

In FIG. 15, a basic communication method is the same as in FIG. 13. However, base stations do not operate a timer. Moreover, the base stations generate a coded block until an ACK signal is received and transmit the coded block to a receiving side. Furthermore, a NACK signal is not transmitted even though an error is detected and a corresponding data block is discarded.

In FIG. 15, the network environment illustrated in FIG. 5 may be applied.

One or more base stations can share original data received from an upper layer as illustrated in FIG. 5. A first base station B may be a serving station and a second base station C may be an adjacent base station. Therefore, the first base station previously transmits the original data provided to the mobile station A to the second base station so that the second base station can provide service with the same data to the mobile station A.

One or more base stations code the original data received from the upper layer in the unit of data block set. Desirably, each base station may code data received from the upper layer by using the random linear coding described with reference to FIG. 6a. It is assumed that the number (n) of data blocks contained in a data block set is 6.

Therefore, the base stations generate a first coded block set (coded block set 0) including 6 coded blocks by the random linear coding. The base stations B and C continue to generate coded blocks until an ACK signal is received.

Referring to FIG. 15, while transmitting the first coded block set, the first and second base stations transmit coded blocks to the mobile station. If the mobile station receives 6 independent coded blocks, the original data can be restored.

Therefore, upon receipt of independent coded blocks (coded blk a, coded blk b, coded blk c, coded blk 0, coded blk 1, and coded blk 2), the mobile station can transmit the ACK signal to the first base station.

The ACK signal transmitted by the mobile station is not immediately transmitted to the first base station due to a transmission delay. Then the first and second base stations continue to generate coded blocks (coded blk a' and coded blk 1') by using the original data and transmit those coded blocks to the mobile station.

The mobile station receiving coded blk a' and coded blk 1' discards them, because the same data as successfully restored data is received. The mobile station transmits a redundant ACK signal to the first base station to inform that the original data has been successfully restored. Since the first base station has performed the next operation according to the previously received ACK signal, the first base station disregards or discards the redundant ACK signal.

After the first base station receives the ACK signal, the first and second base stations construct a second coded block set (coded block set 1).

While the second coded block set is transmitted, coded blk a transmitted by the first base station is normally received by the mobile station but coded blk b is lost in a wired or wireless network. Although coded blk c is transmitted to the mobile station, it can not be used to restore the original data due to detection of an error. Therefore, the mobile station discards coded blk c and waits for the next coded block.

A coded block (coded blk 0) transmitted by the second base station is lost in a wired or wireless network so that the mobile station does not receive coded blk 0. Although coded blk 1 is received by the mobile station, it can not be used to restore the original data due to detection of an error. Therefore, the mobile station discards coded blk 1 and waits for the next coded block. However, coded blk 2 transmitted by the second base station is normally received by the mobile station.

In the process of transmitting the second coded block set, the number of data blocks received normally by the mobile station is 4. However, 2 of them have errors and thus can not be used to restore the original data. Therefore, the mobile station can not transmit an ACK signal in the unit of code block set and waits for coded blocks until the number (n) of independent data blocks necessary for restoring the original data becomes 6.

Since the ACK signal is not transmitted, the first and second base stations re-construct coded blocks (coded blk a', coded blk b' and coded blk c'; coded blk 0', coded blk 1' and coded blk 2') by using the original data.

The coded block (coded blk a') transmitted by the first base station is normally received by the mobile station. The coded block (coded blk b') is lost in a wired or wireless network. The coded block (coded blk c') is received by the mobile station but it can not be used to restore the original data due to detection of an error. Therefore, the mobile station discards a corresponding data block (coded blk c') and waits for the next data block.

The coded block (coded blk 0') transmitted by the second base station is lost in a wired or wireless network. The coded blocks (coded blk 1' and coded blk 2') are normally received by the mobile station.

While mobile station transmits the second coded block set, the number of normally received independent data blocks is 5 (coded blk a, coded blk 2, coded blk a', coded blk 1', and coded blk 2'). Therefore, since a condition required to restore the original data block is not satisfied, the mobile station waits for the next coded block.

Since the first and second base stations have not received an ACK signal, the first and second base stations re-construct coded blocks (coded blk a", coded blk b", coded blk 0", coded blk 1") by using the original data.

The coded block (coded blk a") transmitted by the first base station is normally received by the mobile station. In this case, since the number of independent data blocks is 6, the mobile station can transmit an ACK signal to the first base station which is a serving base station in the unit of data block set. However, the first and second base stations transmit coded blk b", coded blk 0" and coded blk 1" to the mobile station before the ACK signal is transmitted to the first base station due to a transmission delay. The mobile station transmits the ACK signal again to the first base station, because coded blk b", coded blk 0", and coded blk 1" are information on successfully restored data.

Since the first base station has received the ACK signal and performed the next data communication process, the first base station disregards or discards the subsequently received ACK signals as redundant ACK signals.

Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to data processing and data re-transmission in a broadband wireless access system. The present invention provides a downlink data transmission method and an uplink data transmission method and can effectively control errors during data transmission.

The invention claimed is:

1. An uplink data communication method of a transmitting side in a communication system, comprising:
    generating a coded block set including coded blocks of a predetermined number;
    transmitting each of the coded blocks of the predetermined number to both a first base station and a second base station;
    setting a timer after a last coded block among the coded blocks of the predetermined number; and
    if a time interval set by the timer is passed without receiving an acknowledgement (ACK) signal, generating one or more coded blocks corresponding to the number of non-acknowledgment (NACK) signals,
    wherein the ACK signal is received in response to the coded block set when all of the coded blocks of the coded block set have been successfully received by the first base station and the NACK signal is received in response to each coded block of the coded blocks when each coded block has not been successfully received by the first base station,
    wherein the coded blocks received by the second base station are delivered to the first base station, and wherein the number of delivered coded blocks from the second base station reduces the number of NACK signals.

2. The method of claim 1, wherein the coded blocks are coded by using random linear coding and the coded blocks are independent of each other.

3. The method of claim 2, wherein the coded block set is generated by coding an original data in a unit of an original data block set, and the coded blocks of the predetermined number contained in the coded block set are generated by a coding process using a random coefficient.

4. The method of claim 1, wherein the transmitting side is located at a cell boundary of at least one of the first base station and the second base station.

* * * * *